United States Patent
Kim et al.

(10) Patent No.: US 10,310,733 B2
(45) Date of Patent: Jun. 4, 2019

(54) METHOD AND ELECTRONIC DEVICE FOR RECOGNIZING TOUCH

(71) Applicant: Samsung Electronics Co., Ltd., Gyeonggi-do (KR)

(72) Inventors: Chang Jin Kim, Gyeonggi-do (KR); Man Sung Kim, Gyeonggi-do (KR); Jong Kon Bae, Seoul (KR); Kwang Tai Kim, Gyeonggi-do (KR); Min Uk Kim, Gyeonggi-do (KR); Dong Hyun Yeom, Gyeonggi-do (KR); Kyoung Taek Lee, Seoul (KR); Hoon Do Heo, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 2 days.

(21) Appl. No.: 15/665,723

(22) Filed: Aug. 1, 2017

(65) Prior Publication Data
US 2018/0032248 A1 Feb. 1, 2018

(30) Foreign Application Priority Data

Aug. 1, 2016 (KR) .................. 10-2016-0098167
Jan. 19, 2017 (KR) .................. 10-2017-0009445

(51) Int. Cl.
*G06F 3/045* (2006.01)
*G06F 3/0488* (2013.01)
(Continued)

(52) U.S. Cl.
CPC ........ *G06F 3/04886* (2013.01); *G06F 1/3262* (2013.01); *G06F 3/044* (2013.01);
(Continued)

(58) Field of Classification Search
USPC ............... 345/173, 174, 156, 589, 660, 1.3; 455/566
See application file for complete search history.

(56) References Cited

U.S. PATENT DOCUMENTS 9,063,564 B2 6/2015 Lombardi et al.
2008/0158177 A1* 7/2008 Wilson .................. G06F 3/0416
345/173

(Continued)

FOREIGN PATENT DOCUMENTS

JP 2012-128611 A 7/2012
KR 10-2012-0008477 A 1/2012
(Continued)

OTHER PUBLICATIONS

International Search Reported dated Nov. 22, 2017.

*Primary Examiner* — Thuy N Pardo
(74) *Attorney, Agent, or Firm* — Cha & Reiter, LLC

(57) ABSTRACT

An electronic device includes a processor, a touch sensor, and a touch controller including a register. The processor writes, into the register, data associated with a partial area of the touch sensor specified to sense an effective touch. When the effective touch is sensed in the partial area of the touch sensor, the touch controller writes data associated with the effective touch into the register, and the processor reads the data associated with the effective touch from the register when the data associated with the effective touch is written in the register.

18 Claims, 17 Drawing Sheets

(51) Int. Cl.
*G06F 3/041* (2006.01)
*G06F 3/044* (2006.01)
*G06F 1/3234* (2019.01)

(52) U.S. Cl.
CPC ............ *G06F 3/045* (2013.01); *G06F 3/0412* (2013.01); *G06F 3/0416* (2013.01); *Y02D 50/20* (2018.01)

(56) References Cited

U.S. PATENT DOCUMENTS

| | | | | |
|---|---|---|---|---|
| 2010/0238139 | A1* | 9/2010 | Goertz | G06F 3/042 345/175 |
| 2010/0273533 | A1 | 10/2010 | Cho | |
| 2011/0090169 | A1* | 4/2011 | Karhiniemi | G06F 3/04883 345/173 |
| 2011/0164062 | A1* | 7/2011 | Nakamura | G01C 21/3664 345/660 |
| 2011/0187655 | A1* | 8/2011 | Min | G06F 1/1643 345/173 |
| 2012/0081385 | A1* | 4/2012 | Cote | H04N 5/23219 345/589 |
| 2012/0262416 | A1* | 10/2012 | Kitamura | G06F 1/3262 345/174 |
| 2013/0222295 | A1 | 8/2013 | Lim et al. | |
| 2014/0225857 | A1* | 8/2014 | Ma | G06F 3/0418 345/174 |
| 2014/0253577 | A1* | 9/2014 | Jang | G01C 21/32 345/589 |
| 2014/0285422 | A1* | 9/2014 | Kang | G06F 3/04883 345/156 |
| 2014/0327630 | A1* | 11/2014 | Burr | G06F 3/0488 345/173 |
| 2015/0042571 | A1 | 2/2015 | Lombardi et al. | |
| 2015/0054765 | A1* | 2/2015 | Kurokawa | G06F 3/0412 345/173 |
| 2015/0094120 | A1* | 4/2015 | Suh | G06F 3/04883 455/566 |
| 2015/0185811 | A1* | 7/2015 | Connell | G06T 1/60 345/173 |
| 2015/0220299 | A1* | 8/2015 | Kim | G06F 3/0488 345/1.3 |
| 2015/0309691 | A1* | 10/2015 | Seo | G06F 1/1641 345/173 |
| 2015/0378503 | A1* | 12/2015 | Seo | G06F 1/1641 345/173 |
| 2016/0093024 | A1 | 3/2016 | Kang et al. | |
| 2016/0110003 | A1* | 4/2016 | Shim | G06F 3/0487 345/173 |
| 2016/0124574 | A1* | 5/2016 | Rouaissia | G06F 3/0418 345/174 |
| 2016/0147371 | A1 | 5/2016 | Jin et al. | |
| 2016/0162068 | A1* | 6/2016 | Monney | G06F 3/017 345/174 |
| 2016/0170548 | A1* | 6/2016 | Suzuki | G06F 3/0416 345/174 |
| 2017/0011624 | A1* | 1/2017 | Guihot | G08C 17/02 345/174 |
| 2017/0052698 | A1* | 2/2017 | Seo | G06F 1/1641 345/173 |
| 2017/0153743 | A1* | 6/2017 | Kim | G02B 6/0036 345/174 |

FOREIGN PATENT DOCUMENTS

| | | |
|---|---|---|
| KR | 20130045750 A | 5/2013 |
| KR | 20130096919 A | 9/2013 |
| KR | 20140037638 A | 3/2014 |
| KR | 10-2016-0036345 A | 4/2016 |
| KR | 10-2016-0040262 A | 4/2016 |
| KR | 20160062585 A | 6/2016 |

* cited by examiner

METHOD AND ELECTRONIC DEVICE FOR RECOGNIZING TOUCH

CLAIM OF PRIORITY

This application claims the benefit under 35 U.S.C. § 119(a) of a Korean patent application filed on Aug. 1, 2016 in the Korean Intellectual Property Office and assigned Serial number 10-2016-0098167 and a Korean patent application filed on Jan. 19, 2017 in the Korean Intellectual Property Office and assigned Serial number 10-2017-0009445, the entire disclosure of which is hereby incorporated by reference.

TECHNICAL FIELD

The present disclosure generally relates to a method for recognizing a touch input and an electronic device performing the same.

BACKGROUND

With the development of mobile communication technologies, the latest electronic devices may freely connect to wireless/wired networks and are easily portable. For example, portable electronic devices such as smartphones, tablet personal computers (PC), and the like are able to support various functions, such as connecting to the Internet and playing back multimedia content, placing phone calls, send/receive messages, etc.

The display of the portable electronic device may be implemented with a touchscreen display that includes a touch sensor. The touchscreen display may perform the role of an input device that receives user manipulation or input, and also perform the role of an output device that provides visual displays to the user.

SUMMARY

The electronic device may also output information, such as time, date, and/or notifications, in the touchscreen display even when the electronic device is in an inactive state (e.g., in a sleep state). In the scenario, the electronic device implements a so-called always-on display (AOD) and outputs information even in the inactive state when power consumption is reduced.

The electronic device may output, for example, graphic user interface (GUI) objects such as icons of applications, widgets, and notification events, in the AOD. But because the electronic device is inactive, the user may not be allowed to directly select the GUI object displayed in the AOD. It is because while inactive, the touch sensor of the touch screen may be inoperative. In this case, the user has to first place the electronic device back in the active state (e.g. by pressing the home button of the device). Then, the user may select one of the GUI objects presented on the touchscreen display while the electronic device was in the active state.

Aspects of the present disclosure are to address at least the above-mentioned problems and/or disadvantages and to provide at least the advantages described below. Accordingly, an aspect of the present disclosure is to provide a method for recognizing an effective touch to a GUI object through a specific area on a touchscreen display when an electronic device is in an inactive state (e.g., a sleep state) and the electronic device performing the same.

In accordance with an aspect of the present disclosure, an electronic device may include a processor, a touch sensor, and a touch controller including a register. The processor may write, into the register, data associated with a partial area of the touch sensor specified to sense an effective touch. When the effective touch is sensed in the partial area of the touch sensor, the touch controller may write data associated with the effective touch into the register. And when the data associated with the effective touch is written into the register, the processor may read the data associated with the effective touch from the register.

In accordance with another aspect of the present disclosure, a touch recognition method may include writing, into a register included in a touch controller, data associated with a partial area of a touch sensor specified to sense an effective touch, when the effective touch is sensed in the partial area of the touch sensor, writing, by the touch controller, data associated with the effective touch into the register, and when the data associated with the effective touch is written into the register, reading the data associated with the effective touch from the register.

In accordance with another aspect of the present disclosure, an electronic may include a housing that includes a first surface and a second surface opposite the first surface, a display that is exposed through the first surface and is interposed between the first surface and the second surface, a touch panel that is interposed between the display and the first surface or is coupled to the display, a display driver integrated circuit (DDI) that is electrically connected to the display and including a first memory, a touch controller integrated circuit (IC) electrically connected to the touch panel and includes a second memory, a processor that is electrically connected to the DDI and the touch controller IC, a nonvolatile memory that is electrically connected to the processor. The nonvolatile memory may store instructions that, when executed, cause the processor to store, in the first memory, first data associated with a graphic user interface (GUI) to be displayed in a partial area of the display when the processor is in an inactive or sleep state, to store second data associated with the partial area of the display in the second memory, and to enter the inactive or sleep state after storing the first data and the second data in the first memory and the second memory, respectively.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
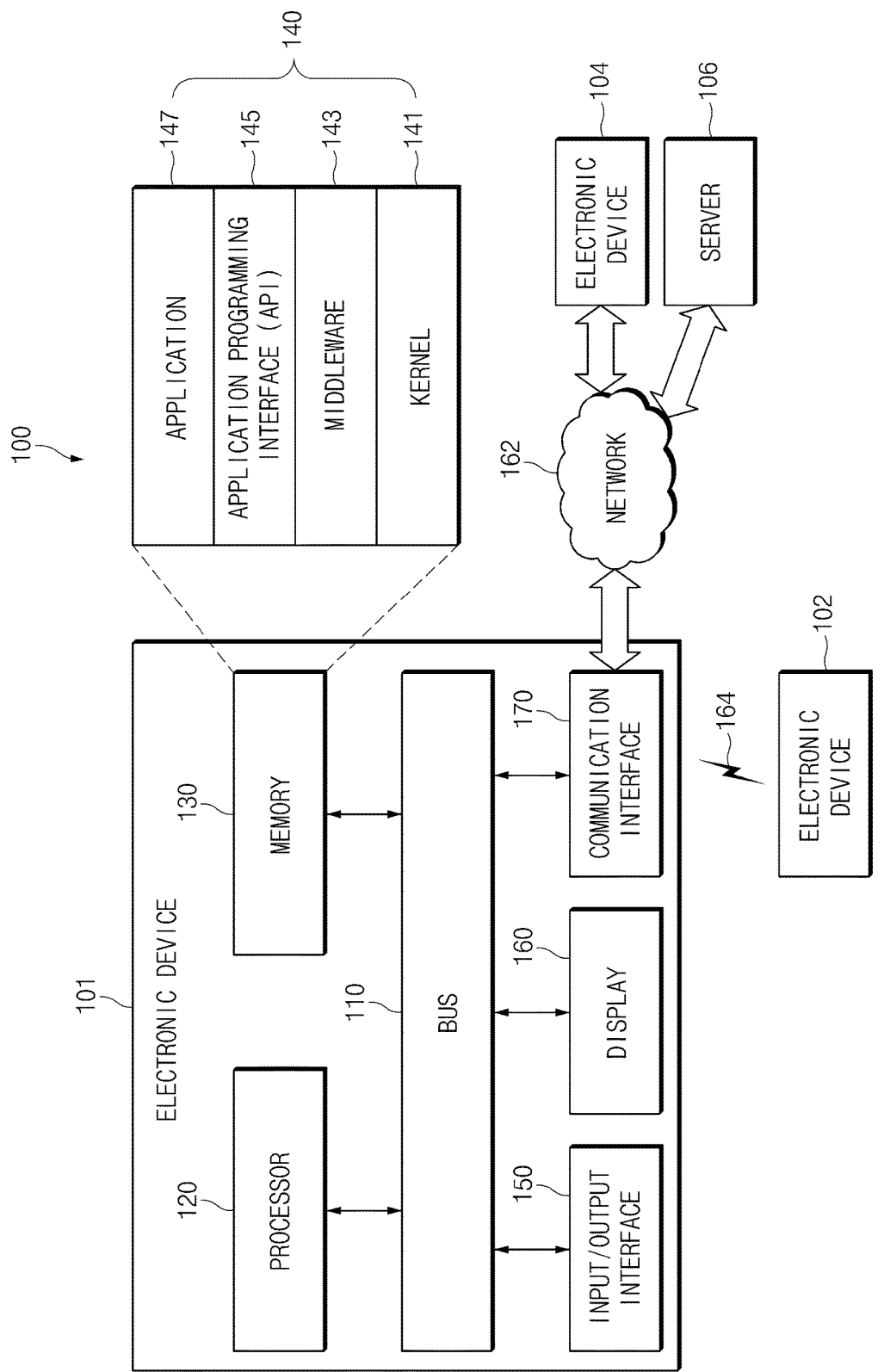
FIG. 1 illustrates an electronic device in a network environment according to one embodiment.

Hereinafter, various embodiments of present disclosure will be described with reference to accompanying drawings. Accordingly, those skilled in the art will recognize that modifications, equivalents, and/or alternatives of the various embodiments described herein can be variously made without departing from the scope and spirit of present disclosure.

In this disclosure, the expressions "have," "may have," "include," and "comprise," "may include," and "may comprise" indicate existence of corresponding features (e.g., elements such as numeric values, functions, operations, or components) but do not exclude presence of additional features.

In this disclosure, the expressions "A or B," "at least one of A or/and B," or "one or more of A or/and B," and the like may include any and all combinations of one or more of the associated listed items. For example, the term "A or B," "at least one of A and B," or "at least one of A or B" may refer to any or all of the cases (1) where at least one A is included, the case (2) where at least one B is included, or the case (3) where both of at least one A and at least one B are included.

The terms, such as "first," "second," and the like used in this disclosure may be used to refer to various elements regardless of the order and/or the priority and to distinguish the relevant elements from other elements, but do not limit the elements. For example, "a first user device" and "a second user device" indicate different user devices regardless of the order or the priority. For example, without departing the scope of this disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used in this disclosure may be used as, for example, the expression "suitable for," "having the capacity to," "designed to," "adapted to," "made to," or "capable of" The term "configured to" may not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in this disclosure are used to describe specified embodiments and are not intended to limit the scope of another embodiment. The terms of a singular form may include plural forms unless otherwise specified. All the terms used herein, which include technical or scientific terms, may have the same meaning that is generally understood by those skilled in the art. It will be further understood that terms, which are defined in a dictionary and commonly used, should also be interpreted as being customary in the relevant art unless expressly so defined in the disclosure. In some cases, even if certain terms are defined in this disclosure, they may not be interpreted to exclude embodiments of this disclosure.

An electronic device according to various embodiments of this disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may be an accessory (e.g., watches, rings, bracelets, anklets, necklaces, glasses, contact lens, or head-mounted-devices (HMDs), a fabric or garment-integrated device (e.g., an electronic apparel), a body-attached device (e.g., a skin pad or tattoos), or a bio-implantable device (e.g., an implantable circuit).

According to one or more embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, and Google TV™), game consoles (e.g., Xbox™ and PlayStation™), electronic dictionaries, electronic keys, camcorders, electronic picture frames, and the like.

According to other embodiments, an electronic device may be various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI) device, a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to yet other embodiments, the electronic device may include parts of furniture or buildings/structures, electronic boards, electronic signature receiving devices, projectors, or various measuring instruments (e.g., water meters, electricity meters, gas meters, or wave meters, and the like). According to one or more embodiments, the electronic device may be one of the above-described devices or a combination thereof. An electronic device according to an embodiment may be a flexible electronic device. Furthermore, an electronic device according to an embodiment of this disclosure may not be limited to the above-described electronic devices and may include other electronic devices and/or new electronic devices developed in the art.

Hereinafter, electronic devices according to the various disclosed embodiments will be described with reference to the accompanying drawings. In this disclosure, the term "user" may refer to a person who uses an electronic device or may refer to a device (e.g., an artificial intelligence electronic device) that uses the electronic device.

FIG. 1 illustrates a block diagram of an electronic device in a network environment, according to one embodiment.

Referring to FIG. 1, according to one embodiment, an electronic device 101, 102, or 104 or a server 106 may be connected with each other over a network 162 or local wireless communication 164. The electronic device 101 may include a bus 110, a processor 120, a memory 130, an input/output interface 150, a display 160, and a communication interface 170. According to an embodiment, the electronic device 101 may not include at least one of the above-described elements or may further include other element(s).

For example, the bus 110 may interconnect the above-described elements 110 to 170 and may include a circuit for conveying communications (e.g., a control message and/or data) among the above-described elements.

The processor 120 may be a central processing unit (CPU), an application processor (AP), or a communication processor (CP). For example, the processor 120 may perform arithmetic operations or data processing associated with control and/or communication of at least one other element(s) of the electronic device 101.

The memory 130 may be a volatile and/or nonvolatile memory. For example, the memory 130 may store instructions or data associated with at least one other element(s) of the electronic device 101. According to an embodiment, the memory 130 may store software and/or a program 140. The program 140 may include, for example, kernel 141, middleware 143, application programming interface (API) 145, and/or application program (or "application") 147. At least a part of the kernel 141, the middleware 143, or the API 145 may be referred to as an "operating system (OS)".

For example, the kernel 141 may control or manage system resources (e.g., the bus 110, the processor 120, the memory 130, and the like) that are used to execute operations or functions of other programs (e.g., the middleware 143, the API 145, and the application program 147). Furthermore, the kernel 141 may provide an interface that allows the middleware 143, the API 145, or the application program 147 to access discrete elements of the electronic device 101 so as to control or manage system resources.

The middleware 143 may perform, for example, a mediation role such that the API 145 or the application program 147 communicates with the kernel 141 to exchange data.

Furthermore, the middleware 143 may process one or more task requests received from the application program 147 according to a priority. For example, the middleware 143 may assign the priority, which makes it possible to use system resources (e.g., the bus 110, the processor 120, the memory 130, or the like) of the electronic device 101, to at least one of the application programs 147. For example, the middleware 143 may process the one or more task requests according to the priority, which makes it possible to perform scheduling or load balancing of the one or more task requests.

The API 145 may be, for example, an interface through which the application program 147 controls a function provided by the kernel 141 or the middleware 143, and may include, for example, at least one interface or function (e.g., an instruction) for a file control, a window control, image processing, a character control, or the like.

The input/output interface 150 may be an interface which transmits an instruction or data input from a user or another external device, to other element(s) of the electronic device 101. Furthermore, the input/output interface 150 may output instructions or data, received from other element(s) of the electronic device 101, to the user or another external device.

The display 160 may be a liquid crystal display (LCD), a light-emitting diode (LED) display, an organic LED (OLED) display, a microelectromechanical systems (MEMS) display, or an electronic paper display, etc. The display 160 may display, for example, various content (e.g., a text, an image, a video, an icon, a symbol, and the like) to the user. The display 160 may include a touch screen and may receive, for example, touch, gesture, proximity, or hovering inputs using an electronic pen or a part of the user's body.

The communication interface 170 may establish communication between the electronic device 101 and an external device (e.g., the first external electronic device 102, the second external electronic device 104, or the server 106). For example, the communication interface 170 may be connected to the network 162 over wireless communication or wired communication to communicate with the external device (e.g., the second external electronic device 104 or the server 106).

The wireless communication may include cellular communication employing at least one of, for example, long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like, as cellular communication protocol. According to an embodiment, the wireless communication may include, for example, at least one of wireless fidelity (Wi-Fi), Bluetooth, Bluetooth low energy (BLE), Zigbee, near field communication (NFC), magnetic stripe transmission (MST), radio frequency (RF), a body area network (BAN), and a global navigation satellite system (GNSS).

The MST may generate a pulse in response to transmission data using an electromagnetic signal, and the pulse may generate a magnetic field signal. The electronic device 101 may transfer the magnetic field signal to point of sale (POS), and the POS may detect the magnetic field signal using a MST reader. The POS may recover the data by converting the detected magnetic field signal to an electrical signal.

The GNSS may be, for example, a global positioning system (GPS), a global navigation satellite system (Glonass), a Beidou navigation satellite system (Beidou), or an European global satellite-based navigation system (Galileo). The GNSS may be selected based on the available region, the selected bandwidth, or the like. Hereinafter, in this disclosure, "GPS" and "GNSS" may be interchangeably used. The wired communication may employ, for example, universal serial bus (USB), high definition multimedia interface (HDMI), recommended standard-232 (RS-232), plain old telephone service (POTS), or the like. The network 162 may include a telecommunications network such as a computer network (e.g., LAN or WAN), the Internet, or a telephone network.

Each of the first and second external electronic devices 102 and 104 may be different from or the same as that of the electronic device 101. According to an embodiment, the server 106 may include a group of one or more servers. According to one embodiment, all or a portion of operations performed in the electronic device 101 may be executed by another electronic device (e.g., the electronic devices 102 and 104 or the server 106). According to an embodiment, in the case where the electronic device 101 executes a function or service automatically or in response to a request, the electronic device 101 may not perform the function or the service internally, but, alternatively or additionally, it may request at least a portion of the function or service be performed by another device (e.g., the electronic device 102 or 104 or the server 106). The other electronic device (e.g., the electronic device 102 or 104 or the server 106) may execute the requested function and may transmit the execution result to the electronic device 101. The electronic device 101 may provide the requested function or service using the received result or may additionally process the received result to provide the requested function or service. To this end, for example, cloud computing, distributed computing, or client-server computing may be used.

Figure 2:
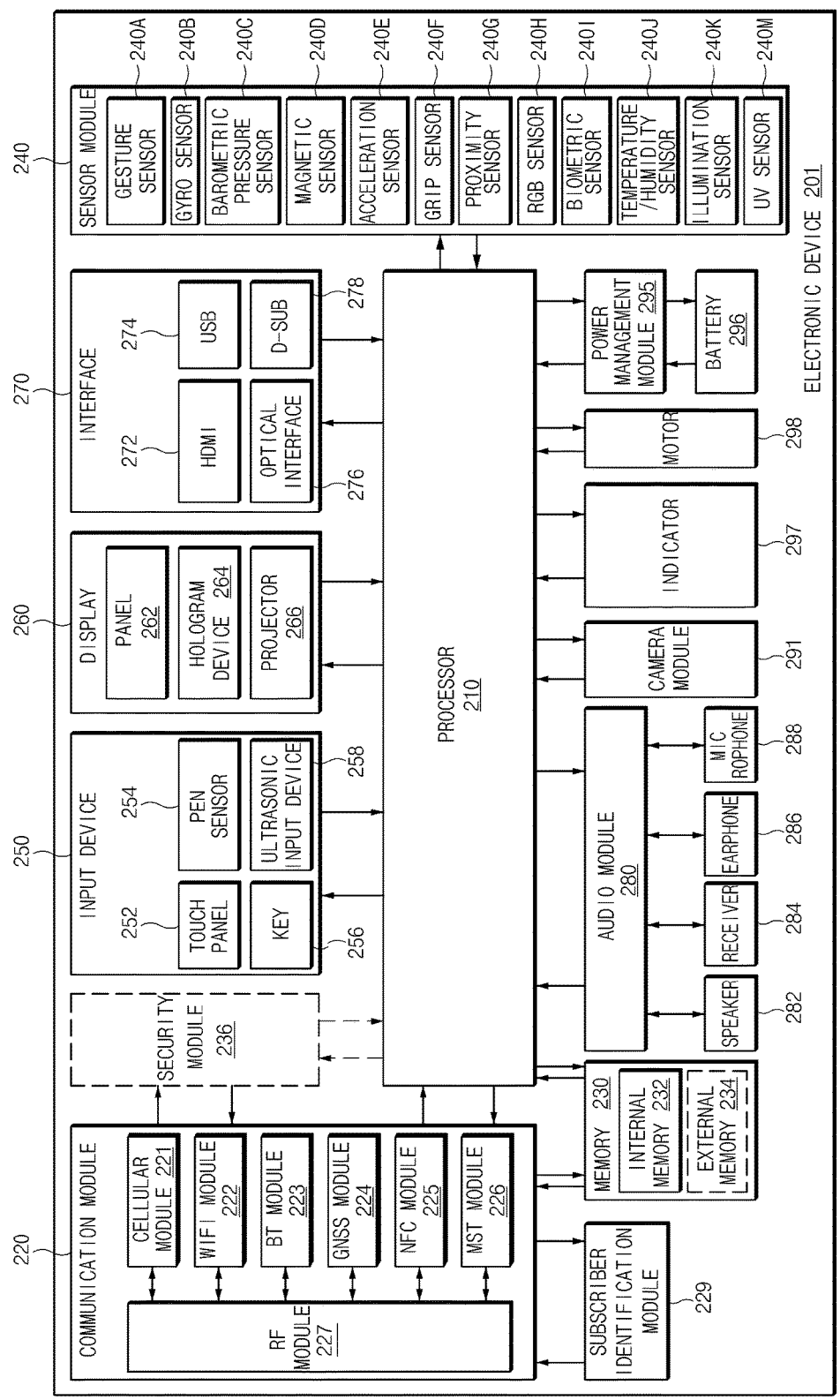
FIG. 2 illustrates a block diagram of the electronic device according to one embodiment.

FIG. 2 illustrates a block diagram of an electronic device, according to one embodiment.

Referring to FIG. 2, an electronic device 201 may include, for example, an entire part or a part of the electronic device 101 illustrated in FIG. 1. The electronic device 201 may include one or more processors (e.g., an application processor; AP) 210, a communication module 220, a subscriber identification module 229, a memory 230, a sensor module 240, an input device 250, a display 260, an interface 270, an audio module 280, a camera module 291, a power management module 295, a battery 296, an indicator 297, and a motor 298.

The processor 210 may operate, for example, an operating system (OS) or an application to control a plurality of hardware or software elements connected to the processor 210 and may process and compute a variety of data. For example, the processor 210 may be implemented with a System on Chip (SoC). According to an embodiment, the processor 210 may further include a graphic processing unit (GPU) and/or an image signal processor. The processor 210 may include at least a part (e.g., a cellular module 221) of elements illustrated in FIG. 2. The processor 210 may load an instruction or data, which is received from at least one of other elements (e.g., a nonvolatile memory), into a volatile memory and process the loaded instruction or data. The processor 210 may store a variety of data in the nonvolatile memory. The processor 210 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for". In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

The communication module 220 may be configured the same as or similar to the communication interface 170 of FIG. 1. The communication module 220 may include a cellular module 221, a Wi-Fi module 222, a Bluetooth (BT) module 223, a GNSS module 224 (e.g., a GPS module, a Glonass module, a Beidou module, or a Galileo module), a near field communication (NFC) module 225, a MST module 226, and a radio frequency (RF) module 227.

The cellular module 221 may provide, for example, voice communication, video communication, Internet service, or the like over a communication network. According to an embodiment, the cellular module 221 may perform discrimination and authentication of the electronic device 201 within the communication network by using the subscriber identification module (e.g., a SIM card) 229. According to an embodiment, the cellular module 221 may perform at least a portion of functions that the processor 210 provides. According to an embodiment, the cellular module 221 may include a communication processor (CP).

Each of the Wi-Fi module 222, the BT module 223, the GNSS module 224, the NFC module 225, or the MST module 226 may include a processor for processing data exchanged through the corresponding module, for example. According to an embodiment, at least some (e.g., two or more) of the cellular module 221, the Wi-Fi module 222, the BT module 223, the GNSS module 224, the NFC module 225, or the MST module 226 may be included within one Integrated Circuit (IC) or an IC package.

For example, the RF module 227 may transmit and receive communication signals (e.g., RF signals). For example, the RF module 227 may include a transceiver, a power amplifier module (PAM), a frequency filter, a low noise amplifier (LNA), an antenna, or the like. According to another embodiment, at least one of the cellular module 221, the Wi-Fi module 222, the BT module 223, the GNSS module 224, the NFC module 225, or the MST module 226 may transmit and receive RF signals through a separate RF module.

The subscriber identification module 229 may be for example, a card and/or an embedded SIM that includes the subscriber identification module and may include unique identify information (e.g., integrated circuit card identifier (ICCID)) or subscriber information (e.g., international mobile subscriber identity (IMSI)).

The memory 230 (e.g., the memory 130) may include an internal memory 232 or an external memory 234. For example, the internal memory 232 may be a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 234 may further be a flash drive such as compact flash (CF), secure digital (SD), micro secure digital (Micro-SD), mini secure digital (Mini-SD), extreme digital (xD), a multimedia card (MMC), a memory stick, or the like. The external memory 234 may be operatively and/or physically connected to the electronic device 201 through various interfaces.

A security module 236 may be a module that includes a storage space for which the security level is higher than that of the memory 230 and may be a circuit that guarantees safe data storage in a protected execution environment. The security module 236 may be implemented with a separate circuit and may include a separate processor. For example, the security module 236 may be in a smart chip or a secure digital (SD) card, which is removable, or may include an embedded secure element (eSE) embedded in a fixed chip of the electronic device 201. Furthermore, the security module 236 may operate based on an operating system (OS) that is different from the OS of the electronic device 201. For example, the security module 236 may operate based on java card open platform (JCOP) OS.

The sensor module 240 may measure, for example, a physical quantity or may detect an operation state of the electronic device 201. The sensor module 240 may convert the measured or detected information to an electric signal. For example, the sensor module 240 may include at least one of a gesture sensor 240A, a gyro sensor 240B, a barometric pressure sensor 240C, a magnetic sensor 240D, an acceleration sensor 240E, a grip sensor 240F, the proximity sensor 240G, a color sensor 240H (e.g., red, green, blue (RGB) sensor), a biometric sensor 240I, a temperature/humidity sensor 240J, an illuminance sensor 240K, or an UV sensor 240M. Although not illustrated, the sensor module 240 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling at least one or more sensors included therein. According to an embodiment, the electronic device 201 may further include a processor that is a part of the processor 210 or independent of the processor 210 and is configured to control the sensor module 240. The processor may control the sensor module 240 while the processor 210 remains at a sleep state.

The input device 250 may be, for example, a touch panel 252, a (digital) pen sensor 254, a key 256, or an ultrasonic input unit 258. For example, the touch panel 252 may use capacitive, resistive, infrared and/or ultrasonic detecting methods. Also, the touch panel 252 may further include a control circuit. The touch panel 252 may further include a tactile layer to provide tactile feedback to the user.

The (digital) pen sensor 254 may be, for example, a part of a touch panel or may include an additional sheet for recognition. The key 256 may include, for example, a physical button, an optical key, or a keypad. The ultrasonic input device 258 may detect (or sense) an ultrasonic signal, which is generated from an input device, through a microphone (e.g., a microphone 288) and may check data corresponding to the detected ultrasonic signal.

The display 260 (e.g., the display 160) may be the panel 262, the hologram device 264, or the projector 266. The panel 262 may be the same as or similar to the display 160 illustrated in FIG. 1. The panel 262 may be implemented, for example, to be flexible, transparent or wearable. The panel 262 and the touch panel 252 may be integrated into a single module. The hologram device 264 may display a stereoscopic image into space using light interference. The projector 266 may project light onto a screen so as to display an image. For example, the screen may be arranged to be within or outside the electronic device 201. According to an embodiment, the panel 262 may include a pressure sensor (or force sensor) that measures the intensity of touch pressure by the user. The pressure sensor may be implemented integrally with the touch panel 252, or may be implemented as at least one sensor separately from the touch panel 252. According to an embodiment, the display 260 may further include a control circuit for controlling the panel 262, the hologram device 264, or the projector 266.

The interface 270 may be, for example, the high-definition multimedia interface (HDMI) 272, the universal serial bus (USB) 274, the optical interface 276, or the D-subminiature (D-sub) 278. The interface 270 may be included, for example, in the communication interface 170 illustrated in FIG. 1. Additionally, the interface 270 may further include, for example, a mobile high definition link (MHL) interface, a SD card/multi-media card (MMC) interface, or an infrared data association (IrDA) standard interface.

The audio module 280 may convert sounds to electrical signals or vice versa. At least a part of the audio module 280 may be included, for example, in the input/output interface 150 illustrated in FIG. 1. The audio module 280 may process, for example, sound information that is input or output through the speaker 282, the receiver 284, the earphone 286, or the microphone 288.

For example, the camera module 291 may shoot a still image or a video. According to an embodiment, the camera module 291 may include image sensors (e.g., a front sensor or a rear sensor), lenses, one or more image signal processors (ISP), and/or a flash (e.g., an LED or a xenon lamp).

The power management module 295 may manage, for example, the power of the electronic device 201. According to an embodiment, a power management integrated circuit (PMIC), a charger IC, or a battery or fuel gauge may be included in the power management module 295. The PMIC may employ wired or wireless charging methods. The wireless charging method may employ, for example, magnetic resonance charging, magnetic induction charging or electromagnetic charging. The PMIC may further include additional circuits such as coil loops, resonant circuits, rectifiers, or the like. The battery gauge may measure, for example, the remaining capacity of the battery 296 and the voltage, current or temperature thereof while the battery is charged. The battery 296 may be, for example, a rechargeable battery and/or a solar battery.

The indicator 297 may display a specified state of the electronic device 201 or a part thereof (e.g., the processor 210), such as states when the electronic device 201 is booting state, transmitting/receiving a message, charging state, etc. The motor 298 may convert an electrical signal into a mechanical vibration and may generate vibration, haptic feedback, etc. Although not illustrated, a processing device (e.g., a GPU) for supporting a mobile TV may be included in the electronic device 201. The processing device for supporting the mobile TV may process media data according to the standards of digital multimedia broadcasting (DMB), digital video broadcasting (DVB), MediaFLO™, or the like.

Each of the above-mentioned elements of the electronic device according to various embodiments described in this disclosure may be configured with one or more components, and the names of the elements may be changed according to the type of the electronic device. In various embodiments, the electronic device may include at least one of the above-mentioned elements, and some elements may be omitted or other additional elements may be added. Furthermore, some of the elements of the electronic device according to various embodiments may be combined with each other so as to form one entity, so that the functions of the elements may be performed in the same manner as before the combination.

Figure 3:
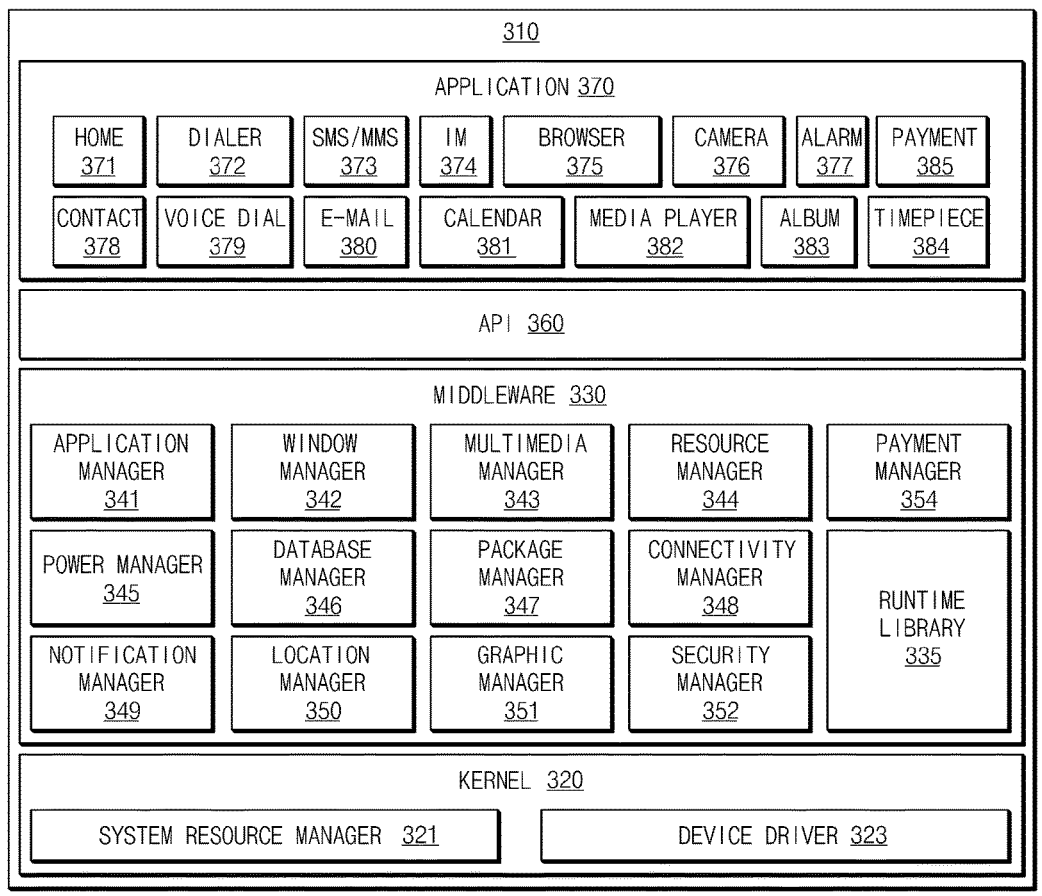
FIG. 3 illustrates a block diagram of a program module according to one embodiment.

FIG. 3 illustrates a block diagram of a program module, according to one embodiment.

According to an embodiment, the program module 310 (e.g., the program 140) may include an operating system (OS) to control resources associated with the corresponding electronic device (e.g., the electronic device 101), and/or applications (e.g., the application program 147) executing on top of the OS. The OS may be, for example, Android, iOS, Windows, Symbian, Tizen, or Bada.

The program module 310 may include the kernel 320, the middleware 330, the application programming interface (API) 360, and/or one or more applications 370. At least a portion of the program module 310 may be preloaded on the electronic device or may be downloadable from an external electronic device (e.g., the electronic device 102 or 104, the server 106, or the like).

The kernel 320 (e.g., the kernel 141) may include, for example, the system resource manager 321 or the device driver 323. The system resource manager 321 may control, allocate, or retrieve system resources. According to an embodiment, the system resource manager 321 may include a process managing unit, a memory managing unit, a file system managing unit, or the like. The device driver 323 may include, for example, a display driver, a camera driver, a Bluetooth driver, a shared memory driver, a USB driver, a keypad driver, a Wi-Fi driver, an audio driver, or an interprocess communication (IPC) driver.

The middleware 330 may provide, for example, functions that the applications 370 needs in common, or may provide various functions to the applications 370 through the API 360 to allow the applications 370 to efficiently use the limited system resources of the electronic device. According to an embodiment, the middleware 330 (e.g., the middleware 143) may include at least one of the runtime library 335, the application manager 341, the window manager 342, the multimedia manager 343, the resource manager 344, the power manager 345, the database manager 346, the package manager 347, the connectivity manager 348, the notification manager 349, the location manager 350, the graphic manager 351, the security manager 352, or the payment manager 354.

The runtime library 335 may include, for example, a library module that is used by a compiler to generate new functions while the application 370 is being executed. The runtime library 335 may perform input/output management, memory management, or arithmetic functions.

The application manager 341 may manage, for example, the life cycles of the applications 370. The window manager 342 may manage the graphic user interface (GUI) resource that is used in the display. The multimedia manager 343 may identify formats necessary for playing back various media files, and may perform encoding or decoding of the media files by using codecs suitable for the formats. The resource manager 344 may manage resources such as storage space, memory, or source code of the applications 370.

The power manager 345 may operate, for example, with the basic input/output system (BIOS) to manage power (e.g. battery power), and may provide power information for operations of the electronic device. The database manager 346 may generate, search for, or modify database that is to be used in at least one application of the applications 370. The package manager 347 may install or update the application that is distributed in the package file.

The connectivity manager 348 may manage, for example, wireless connections such as Wi-Fi or Bluetooth. The notification manager 349 may display or notify an event such as a received message, appointment, or proximity notification. The location manager 350 may manage location information about the electronic device. The graphic manager 351 may manage graphic effects displayed on the display, or manage the user interface relevant thereto. The security manager 352 may provide security functions necessary for system security, such as user authentication or the like. According to an embodiment, in the case where the electronic device (e.g., the electronic device 101) can perform telephony functions, the middleware 330 may further include a telephony manager for managing voice or video calls.

The middleware 330 may include a middleware module that combines various functions of the above-described elements. The middleware 330 may provide modules specialized for each OS. Additionally, the middleware 330 may dynamically remove a part of existing elements or may add new elements thereto.

The API 360 (e.g., the API 145) may be, for example, a set of programming functions and may vary depending on the OS. For example, in the case where the OS is Android, it may provide one API set suitable for the Android OS. In the case where the OS is the tizen OS, it may provide two or more API sets.

The application(s) 370 (e.g., the application program 147) may include, for example, one or more applications such as the home screen 371, the dialer 372, the SMS/MMS application 373, the instant message (IM) application 374, the browser 375, the camera 376, the alarm 377, the contacts 378, the voice dial 379, the e-mail application 380, the calendar 381, the media player 382, the album application 383, a timepiece (clock application) 384, the payment application 385, health care applications (e.g., measuring exercise quantity undertaken by the user, blood sugar, or the like) or environment information applications (e.g., measuring barometric pressure, humidity, temperature, or the like).

According to an embodiment, the application 370 may include an application (hereinafter referred to as "information exchanging application" for descriptive convenience) to support information exchange between the electronic device (e.g., the electronic device 101) and an external electronic device (e.g., the electronic device 102 or 104). The information exchanging application may include, for example, a notification relay application for transmitting specified information to the external electronic device, or a device management application for managing the external electronic device.

For example, the notification relay application may perform the function of transmitting notification information, which arises from other applications (e.g., applications for SMS/MMS, e-mail, health care, or environmental information), to an external electronic device (e.g., the electronic device 102 or 104). Additionally, the notification relay application may receive, for example, notification information from the external electronic device and provide the notification information to the user.

The device management application may manage (e.g., install, delete, or update), for example, at least one function (e.g., turn-on/turn-off of a portion or all of the external electronic device, adjust the brightness or resolution of the display, etc.) of the external electronic device (e.g., the electronic device 102 or 104), an application running in the external electronic device, or a service (e.g., call service, message service, or the like) provided by the external electronic device.

According to an embodiment, the application 370 may include an application (e.g., a health care application of a mobile medical device) that is assigned in accordance with an attribute of the external electronic device (e.g., the electronic device 102 or 104). According to an embodiment, the application 370 may include an application that is received from the external electronic device (e.g., the server 106 or the electronic device 102 or 104). According to an embodiment, the application 370 may include a preloaded application or a third party application that is downloadable from a server. The names of elements of the program module 310 according to the embodiment may be modifiable depending on the type of the underlying operating system.

According to various embodiments, at least a portion of the program module 310 may be implemented by software, firmware, hardware, or a combination of two or more thereof. At least a portion of the program module 310 may be implemented (e.g., executed), for example, by the processor (e.g., the processor 210). At least a portion of the program module 310 may include, for example, modules, programs, routines, sets of instructions, processes, or the like for performing one or more functions.

Figure 4:
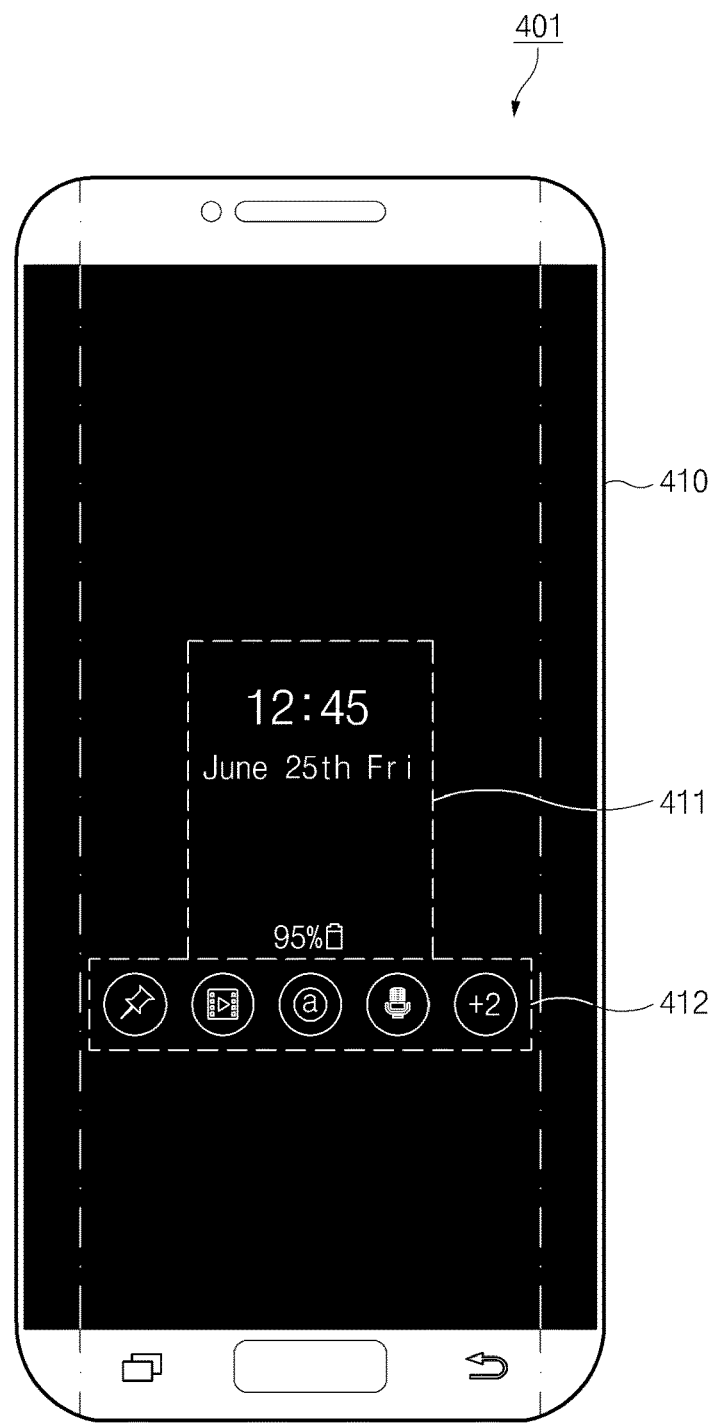
FIG. 4 illustrates the electronic device according to one embodiment of the present disclosure.

FIG. 4 is a diagram illustrating an electronic device according to one embodiment of the present disclosure.

An electronic device 401 according to an embodiment is illustrated in FIG. 4. The electronic device 401 may support an active state (or wake-up state) in which a user is able to use functions of the electronic device 401 and an inactive state (or sleep state) in which the user is not manipulating the electronic device 401.

In the active state (or wake-up state), various hardware and/or software modules in the electronic device 401 may be supplied with sufficient power from a battery so as to fully perform functions thereof. For example, in the active state, a touchscreen display 410 of the electronic device 401 may be supplied with sufficient power to display various contents and also be capable of detecting various touch inputs or gestures from the user with high sensitivity.

In the inactive state (or sleep state), various hardware and/or software modules included in the electronic device 401 may be deactivated or may be supplied with minimum power so as to perform only a specified restricted function. As such, since information processing by hardware and/or software modules is suppressed, battery life may be prolonged. For example, in the inactive state, the processor of the electronic device 401 may allow the hardware modules and/or the software modules to perform only specified functions for the inactive state.

According to an embodiment, the electronic device 401 illustrated in FIG. 4 may operate the touchscreen display in the inactive state (or sleep state). For example, the electronic device 401 in the inactive state may output text/images indicating a digital clock, the date, and the battery state (e.g. charge level of the battery) in the first area 411 of the touchscreen display 410. Also, the electronic device 401 may output various types of GUI objects (or icons) in the second area 412 of the display 410. The text, images, GUI objects, and the like included in the first area 411 and the second area 412 may be collectively referred to as "AOD content".

According to an embodiment, in the electronic device 401 operating in the inactive state, pixels that form the text, the images, the GUI objects, and the like in the first area 411 and the second area 412 may be displayed in a specified color (e.g., white). According to one embodiment of the present disclosure, the remaining pixels that form the background for the AOD content may be displayed in another specified color (e.g., black). In this example, if the touchscreen display 410 is an organic light-emitting diode (OLED) panel, the pixels forming the background may be OFF.

According to an embodiment, the text, the images, the GUI objects, and the like in the first area 411 and the second area 412 may periodically or aperiodically move vertically or horizontally. This is to prevent burn-in of pixels displaying the text, the images, and the GUI objects, such as when the touchscreen display 410 is an organic light-emitting diode (OLED) panel.

According to one embodiment of the present disclosure, the electronic device 401 in the inactive state (e.g., sleep state) may sense a touch input to a GUI object in the second area 412 of the touchscreen display 410. Below, a method for sensing the touch input to the GUI object and an electronic device performing the same will be described with reference to drawings.

Figure 5A:
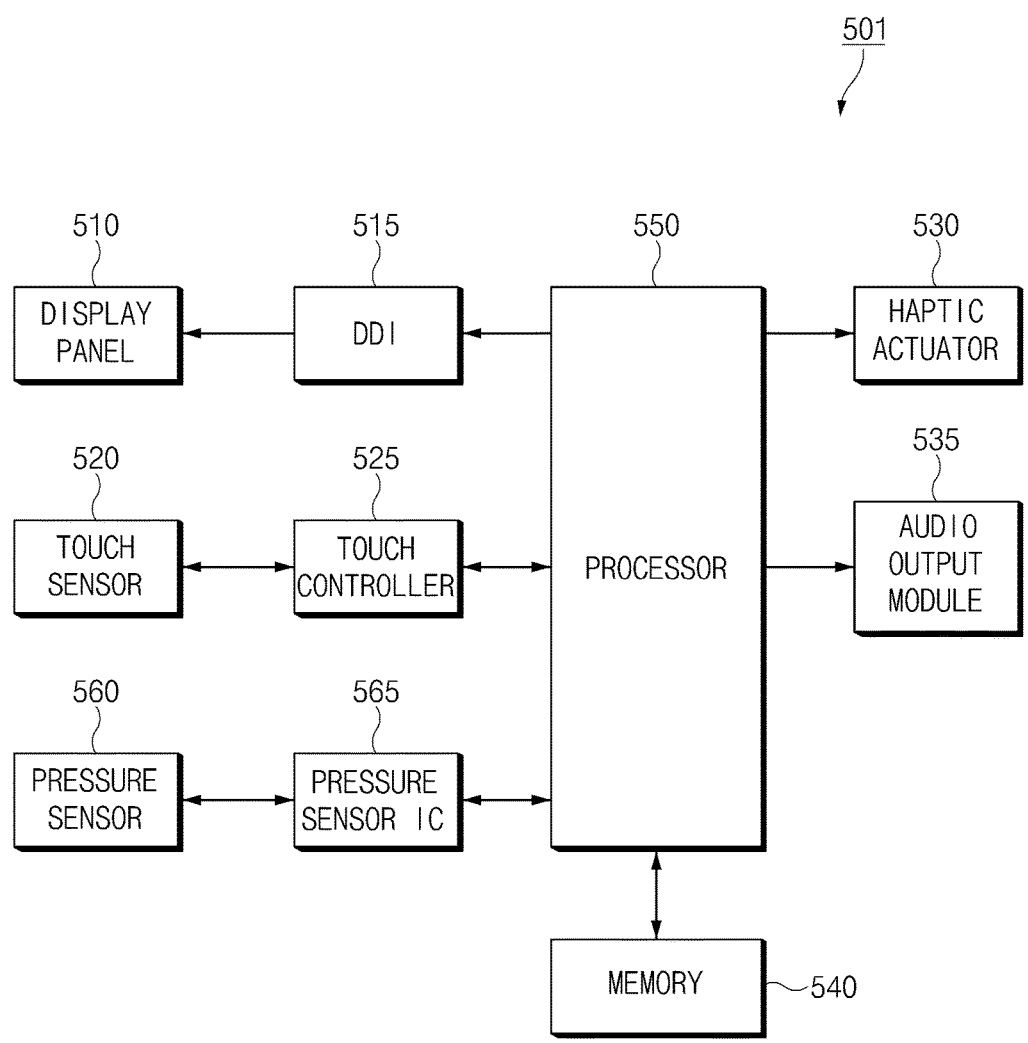
FIG. 5A illustrates a block diagram of the electronic device according to one embodiment.

FIG. 5A illustrates a block diagram of an electronic device according to one embodiment.

Referring to FIG. 5A, an electronic device 501 according to an embodiment may include a display panel 510, a display driver integrated circuit (IC) (DDI) 515, a touch sensor 520, a touch controller 525, a haptic actuator 530, a memory 540, a processor 550, a pressure sensor 560, and a pressure sensor IC 565. According to an embodiment, the electronic device 501 may include a housing that forms the exterior of the electronic device 501. The housing may include a first surface (e.g., front surface) and a second surface (e.g. rear surface) opposite the first surface.

The display panel 510 may be exposed through an opening or a transparent window of the first surface of the housing and may be interposed between the first surface and the second surface. The display panel 510 may receive an image signal from the display driver integrated circuit (DDI) 515. The display panel 510 may display a variety of content (e.g., text, images, videos, icons, widgets, symbols, or the like) based on the image signal. In one embodiment, the display panel 510 may include the touch sensor panel 520 and/or a digitizer panel (not illustrated) for recognizing an electronic pen. In this disclosure, an assembly of the display panel 510 and the touch sensor 520 may be referred to as a "touchscreen display".

The display driver integrated circuit (DDI) 515 may be electrically connected with the display panel 510 and may supply image signals corresponding to image data received from the processor 550 to the display panel 510. Although not illustrated in FIG. 5A, according to one or more embodiments, the display driver integrated circuit 515 may include a graphics RAM, an interface module, an image processing unit, one or more multiplexers, a display timing controller (T-con), a source driver, a gate driver, and/or one or more oscillator.

According to an embodiment, the display driver integrated circuit 515 may supply the image signal to the display panel 510 at a specified frame rate (e.g., 60 frames per second) in the active state (or wake-up state). In this case, the processor 550 may provide image data to the display driver integrated circuit 515 at a relatively high frequency in the active state, compared with when the processor 550 operates in the inactive state (or sleep state).

According to an embodiment, in the inactive state (or sleep state), based on image data stored in the embedded graphics RAM, the display driver integrated circuit 515 may provide the image signal corresponding to the image data to the display panel 510 at a relatively low frequency compared with when the electronic device 501 was operating in the active state (or wake-up state). In this case, while operating the inactive state, the processor 550 may temporarily operate in the active state (or wake-up state) to provide the image data to the display driver integrated circuit 515. Afterwards, the processor 550 may back to the inactive state and thus would no longer affect the internal operations of the display driver integrated circuit 515.

The touch sensor 520 may be interposed between the display panel 510 and the first surface of the housing of the electronic device 501 so that the touch sensor 520 is overlaid with the display panel 510. Alternatively, the touch sensor 520 may be coupled with the display panel 510. In the touch sensor 520, a specified physical quantity (e.g., voltage, light intensity, resistance, amount of electrical charge, capacitance, or the like) may vary when the touch sensor 520 is touched by the user. According to various embodiments, the touch sensor 520 may be referred to using various names, such as touch panel, touch input panel, etc.

The touch controller 525 may be electrically connected with the touch sensor 520, may sense the variation in physical quantity that occurs in the touch sensor 520, and then may calculate data associated with the touch (e.g., the location (expressed in coordinate data (X, Y)) of the touch) based on the variation in physical quantity. The data associated with the touch may be provided to the processor 550.

According to one embodiment of the present disclosure, if a portion (e.g., a finger) of the user or the tip of an electronic pen makes contact with the touch sensor 520, capacitance between a transmitting terminal Tx and a receiving terminal Rx in the touch sensor 520 may vary. For example, the variation in the capacitance may be sensed by the touch controller 525, and the touch controller 525 may provide the coordinate location of the touch to the processor 550. The processor 550 may process the location data of the touch as an event associated with a user input.

According to various embodiments, the touch controller 525 may variously be referred to as a "touch IC", a "touch screen IC", a "touch screen controller IC", etc. According to some embodiments, in an electronic device in which the touch controller 525 is not included, the processor 550 may perform the role of the touch controller 525. According to another embodiment, the touch controller 525 and the processor 550 may be implemented as one element (e.g., one-chip).

The haptic actuator 530 may provide the user with haptic feedback (e.g., vibration) in response to control commands from the processor 550. For example, when a touch input (e.g., a physical touch, a hovering input, or a "force touch") is received from the user, the haptic actuator 530 may provide the user with haptic feedback.

An audio output module 535 may provide the user with auditory feedback (e.g., sound) in response to control commands from the processor 550. For example, when a touch input (e.g., a physical touch, a hovering input, and a "force touch") is received from the user, the audio output module 535 may provide the user with auditory feedback. For example, the audio output module 535 may include a speaker (e.g., 282 of FIG. 2) and/or an earphone/headset (e.g., 286 of FIG. 2).

The memory 540 may store commands or data associated with operations of elements included in the electronic device 501. For example, the memory 540 may store an application program for outputting text, images, GUI object, or the like (e.g., see 411 and 412 of FIG. 4) in the inactive state (e.g., sleep state). Also, for example, the memory 540 may store instructions that, when executed, cause the processor 550 and/or the touch controller 525 to perform various operations (e.g., FIGS. 6, 9, 10, etc.) disclosed in this disclosure.

In one embodiment, the processor 550 may be electrically connected with the elements 510 to 550 included in the electronic device 501 and may execute operations or data processing associated with control and/or communication of the elements 510 to 550 included in the electronic device 501.

Pressure (or force) by an external object (e.g., a finger or an electronic pen) may be sensed in the pressure sensor 560. According to an embodiment, the pressure sensor 560 may include a plurality of electrodes (e.g., transmitting terminals Tx and receiving terminals Rx) with dielectric layers interposed therebetween. If pressure from an external object is received, a physical quantity (e.g., capacitance or the like) between the plurality of electrodes may vary.

The pressure sensor IC 565 may sense the variation in physical quantity (e.g., capacitance or the like) in the pressure sensor 560 and may calculate pressure based on the variation in physical quantity. The calculated pressure may be provided to the processor 550 together with the touch location detected in the touch sensor 520. According to various embodiments, the pressure sensor IC 565 may be referred to as a "force touch controller," a "force sensor IC," a "pressure panel IC," etc. Also, according to one embodiment, the pressure sensor IC 565 may be implemented with one element (e.g., one-chip) together with the touch controller 525 and/or the display driver integrated circuit 515.

Figure 5B:
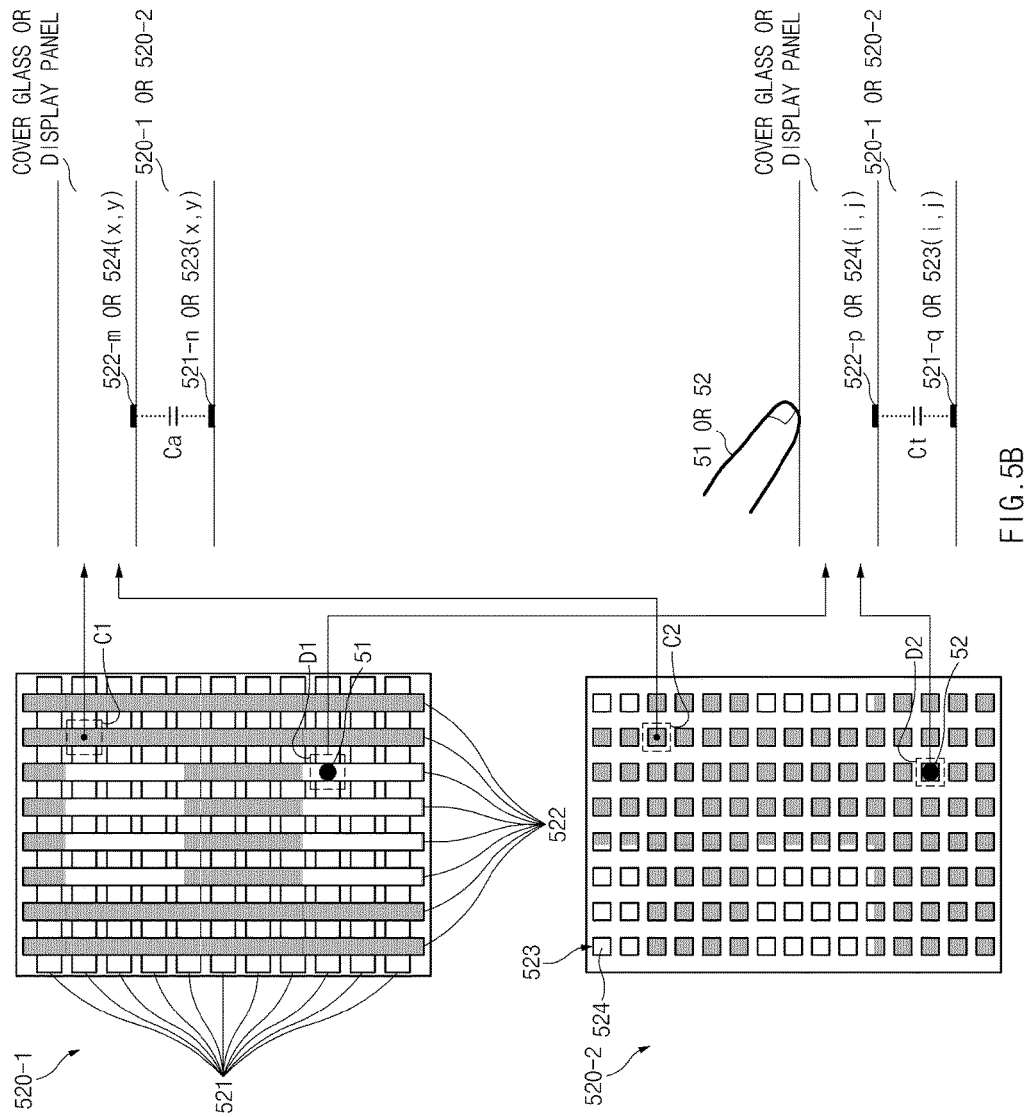
FIG. 5B illustrates a touch sensor according to one embodiment.

FIG. 5B illustrates a touch sensor according to one embodiment.

Two types of touch sensors 520-1 and 520-2 are illustrated in FIG. 5B. The first touch sensor 520-1 may be referred to as a mutual capacitive touch sensor, and the second touch sensor 520-2 may be referred to as a self-capacitive touch sensor. Each of the touch sensors 520-1 and 520-2 may correspond to the touch sensor 520 illustrated in FIG. 5A.

According to an embodiment, the first touch sensor 520-1 may include a plurality of first electrode strips 521 and a plurality of second electrode strips 522. The first electrode strips 521 may be disposed under the second electrode strips 522 in a horizontal direction. The second electrode strips 522 disposed in a vertical direction so that the first electrode strips 521 and the second electrode strips 522 form a lattice shape. For example, in the first touch sensor 520-1, each of the first electrode strips 521 and the second electrode strips 522 may each be formed as a conductive pattern on a sheet. In this case, when assembled, the first electrode strip 521 and the second electrode strip 522 are orthogonal to each other. The touch controller (e.g., 525 of FIG. 5A) may measure capacitance between the first electrode strip 521 and the second electrode strip 522 at a predetermined frequency.

According to another embodiment, the second touch sensor 520-2 may include a plurality of first electrode patches 523 and a plurality of second electrode patches 524. Each of the first electrode patches 523 may be disposed below each of the second electrode patches 524. Each of the first electrode patches 523 and the second electrode patches 524 may have substantially the same size. The first electrode patches 523 and the second electrode patches 524 may be shaped as an array. For example, in the second touch sensor 520-2, the first electrode patches 523 and the second electrode patches 524 may each be formed as a conductive array on a sheet. In this case, when assembled, each of the first electrode patches 523 and its corresponding second electrode patches 524 may be disposed to face each other. According to an embodiment, the touch controller may measure capacitance between the first electrode patch 523 and the second electrode patch 524 at a predetermined frequency.

According to an embodiment, in the first touch sensor 520-1 and the second touch sensor 520-2 above described, the first electrode 521/523 and the second electrode 522/524 may be formed on separate sheets (e.g., separate flexible printed circuit boards (FPCBs)) or may be respectively formed on opposite surfaces of a single sheet. Spacers may be disposed between the first electrode 521/523 and the second electrode 522/524, and any one of the first electrode 521/523 and the second electrode 522/524 may be connected to an internal common ground of the electronic device.

For example, a user touch may not exist at the area C1, in which an n-th first electrode strip 521-n and an m-th second electrode strip 522-m of the first touch sensor 520-1 cross each other, and at the area C2 corresponding to a first electrode patch 523(x,y) and a second electrode patch 524(x,y) that are disposed at the x-th row and y-th column of the second touch sensor 520-2. Preset (default) capacitance Ca may be formed at the area C1 and the area C2. The capacitance Ca may be sensed by the touch controller at the predetermined frequency.

Meanwhile, user touches 51 and 52 may be made at the area D1, in which a q-th first electrode strip 521-q and a p-th second electrode strip 522-p of the first touch sensor 520-1 cross each other, and at the area D2 corresponding to a first electrode patch 523(i,j) and a second electrode patch 524(i,j) that are disposed at the i-th row and j-th column of the second touch sensor 520-2. In this case, in the areas D1 and D2, capacitance between electrodes may vary due to the user touches 51 and 52. Specifically, capacitance between the first electrode strip 521-q and the second electrode strip 522-p and capacitance between the first electrode patch 523(i,j) and the second electrode patch 524(i,j) may increase from Ca to Ct when the user touches 51 and 52 occur. The touch controller may sense the touches 51 and 52 by sensing the increase in the capacitance.

Figure 6A:
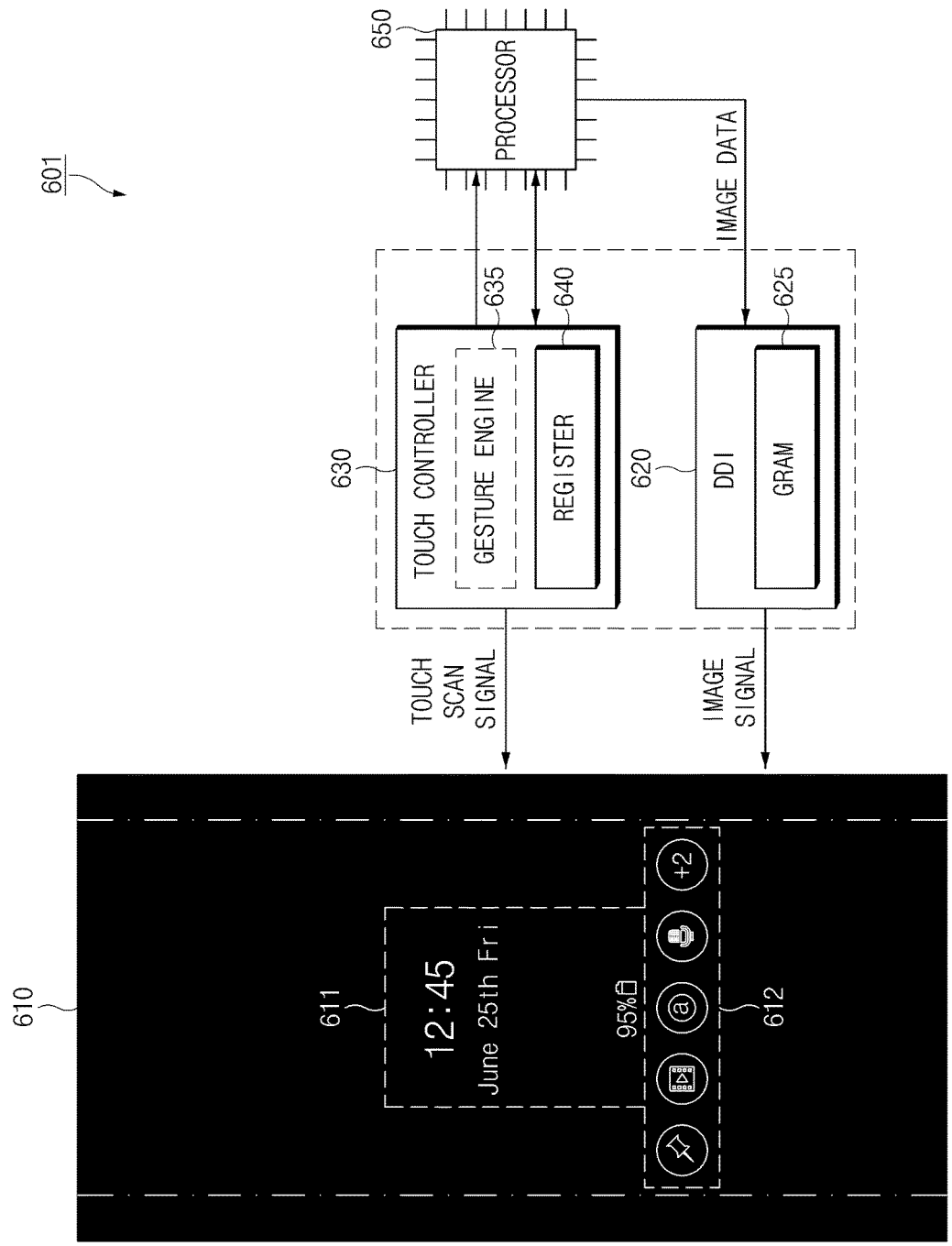
FIG. 6A is a block diagram of a touch sensor according to one embodiment.

FIG. 6A is a block diagram of a touch sensor according to one embodiment.

Referring to FIG. 6A, an electronic device 601 according to an embodiment may include a touchscreen display 610, a display driver integrated circuit (DDI) 620, a touch controller 630 including a register 640 (in detail, refer to FIG. 7B), and a processor 650. The register 640 may be implemented as a non-volatile memory. The electronic device 601 may correspond to the electronic device illustrated in FIGS. 1 to 5A, and a description that is the same or similar as the description given with reference to FIGS. 1 to 5A may be omitted.

The touchscreen display 610 may include a display panel (e.g., 510 illustrated in FIG. 5) and a touch sensor (e.g., 520 illustrated in FIG. 5). Accordingly, for example, content (e.g. text, images, GUI objects, or the like) that is output to the touchscreen display 610 may be understood as content that is outputted to the display panel included in the touchscreen display 610. Also, a detected touch to the touchscreen display 610 may be understood as a touch detected by the touch sensor included in the touchscreen display 610.

According to an embodiment, the processor 650 may interact with the display driver integrated circuit 620. For example, the processor 650 may provide image data of the AOD content (e.g., text, images, GUI objects, or the like) to be output in at least a partial area (e.g., the first area 611 and/or the second area 612) of the touchscreen display 610. The image data of the AOD content may be stored in a graphics RAM (GRAM) 625 included in the display driver integrated circuit 620. While operating the inactive state, the processor 650 may temporarily operate in the active state (or wake-up state) to provide the image data to the graphics RAM (GRAM) 625. After provision of the image data, the processor 650 may enter back to the inactive state (or sleep state).

The processor 650 may provide the image data to the graphics RAM (GRAM) 625, for example, periodically or aperiodically due to external events. For example, the processor 650 may periodically provide image data (e.g., including the digital clock image) to the graphics RAM (GRAM) 625. In this case, the frequency at which the processor 650 provides image data to the graphics RAM (GRAM) 625 may be lower than the frame rate of the touchscreen display 610. For another example, when a notification occurs, the processor 650 may provide image data (e.g., an icon image of an IM application) indicating the notification to the graphics RAM (GRAM) 625 immediately or shortly after the notification occurrence.

According to an embodiment, the display driver integrated circuit 620 may store the image data provided from the processor 650 in the graphics RAM (GRAM) 625. The display driver integrated circuit 620 may convert the image data stored in the graphics RAM (GRAM) 625 into an image signal depending on internal settings or control information received from the processor 650. Since the image signal is supplied to the touchscreen display 610 (i.e. the display panel included in the touchscreen display 610) by the display driver integrated circuit 620, the AOD content (text, images, GUI objects, or the like) may be output in at least a partial area (e.g., the first area 611 and the second area 612) of the touchscreen display 610.

For example, the display driver integrated circuit 620 may receive image data such as icons, numbers, images, or the like from the processor 650 in the active state (or wake-up state). The processor 650 may then enter the inactive state (or sleep state) after providing the image data to the display driver integrated circuit 620. In the inactive state (or sleep state), the display driver integrated circuit 620 may combine the various icons, numbers, images, or the like included in image data to generate an image signal based on control information (e.g., control information indicating notification content) received from the processor 650. The display driver integrated circuit 620 may then output and/or update the touchscreen display 610 with the image signal by its own operation.

According to an embodiment, the processor 650 may interact with the touch controller 630. The processor 650 may write data associated with an area (hereinafter referred to as a "touch recognition area," e.g., the second area 612) in the register 640 of the touch controller 630. The touch recognition area is a partial area of the touch sensor that is configured to detect (effective) touch inputs while the electronic device is in the inactive state. The processor 650 may temporarily operate in the active state (or wake-up state) to write data associated with the touch recognition area (e.g., the second area 612) in the register 640. The processor 650 may enter the inactive state (or sleep state) after writing the data in the register 640.

According to an embodiment, the data associated with the touch recognition area (e.g., the second area 612) may include width and height data for the specified area, and include coordinate data ($X_{offset}$, $Y_{offset}$) associated with one point to define a circumference of the touch recognition area. According to one embodiment, the touch recognition area may include a plurality of touch recognition areas, and data associated with the plurality of touch recognition areas may be written in the register 640 as an array or a table.

According to an embodiment, the processor 650 may write the data associated with the touch recognition area in the register 640 periodically or aperiodically due to external events. For example, the data associated with the touch recognition area (e.g., the second area 612) may be updated periodically or aperiodically to synchronize with the location of content displayed in the second area 612.

According to an embodiment, the touch controller 630 may determine whether an effective touch is sensed in the touch recognition area (e.g., the second area 612) based on the data about touch recognition area (e.g., the second area 612) written in the register 640. In contrast, in the inactive state, touches on the touch screen outside the touch recognition area (e.g., the second area 612) are non-effective. Further, in some embodiments, as will be described later, some touches inside of touch recognition area (e.g., the second area 612) may not be recognized as effective touches for avoiding recognition of unintended touches. If it is determined that the effective touch is sensed in the touch recognition area (e.g., the second area 612), the touch controller 630 may write data (e.g., location coordinate data of the effective touch or the like) associated with the effective touch in the register 640 and may provide an interrupt to the processor 650. Each of the above-described operations of the touch controller 630 may be performed by a gesture engine 635 (software) embedded in an IC constituting the touch controller 630.

The processor 650 may read data associated with the effective touch from the register 640 in response to the interrupt from the touch controller 630. According to an embodiment, the processor 650 may identify the GUI object displayed at the location corresponding to the location of the effective touch. Afterwards, according to one embodiment, the processor 650 may apply a specified graphic effect to the identified GUI object and/or may execute an application program corresponding to the identified GUI object.

According to an embodiment, in the inactive state, the touch controller 630 may drive the touch sensor at a first frequency. But if a touch is sensed in the touch sensor, the touch controller 630 may drive the touch sensor at a second frequency higher than the first frequency, so that the touch sensor can more accurately detect an effective touch (in detail, refer to FIG. 7A).

According to an embodiment, the touch controller 630 may recognize various types of effective touches depending on settings of the register 640. For example, the types of effective touches are initially defined in the register 640. For another example, the processor 650 may write data indicating types of the effective touch in locations of the register 640 (e.g., refer to 743-1 to 743-N of FIG. 7B). When a touch is recognized, the touch controller 630 may determine whether an effective touch of a specific type is sensed, with reference to data indicating the type written in the register 640.

For example, when a double touch (or a double tap) is designated and enabled as the effective touch, type data corresponding to the double touch may be stored in a storage space (e.g., refer to 743-1 of FIG. 7B) of the register 640. Thereby, the touch controller 630 may recognize a double touch (or a double tap) on the touchscreen display 610 as the effective touch. Also, for example, when a long press (i.e., a touch down made during a specified time or more) is designated and enabled as the effective touch, type data corresponding to the long press may be stored in another storage space (e.g., refer to 743-2 of FIG. 7B) of the register 640. Thereby, the touch controller 630 may recognize a long press on the touchscreen display 610 as the effective touch. Preferably, but not limited to, a single tap may not be is designated as the effective touch for avoiding unintended touches in some situations (e.g., touching or grabbing the electronic device 601 in the user's pocket).

Also, as described above, the processor 650 may read data associated with the effective touch from the register 640 and may identify the GUI object corresponding to the effective touch. Afterwards, the processor 650 may execute an application program corresponding to the identified GUI object.

According to an embodiment, the effective touch (e.g., a double touch, a long press, or the like) may include at least one touch down and at least one touch release. Before the touch controller 630 according to an embodiment executes the application program corresponding to the identified GUI object, the touch controller 630 may write data indicating the at least one touch down or the at least one touch release in the register 640. Upon detecting an effective touch, the touch controller 630 may provide an interrupt to the processor 650. The processor 650 may apply a specified graphic effect (e.g., color inversion of the identified GUI object or temporary enlargement/reduction of the identified GUI object) to the identified GUI object in response to the interrupt.

Figure 6B:
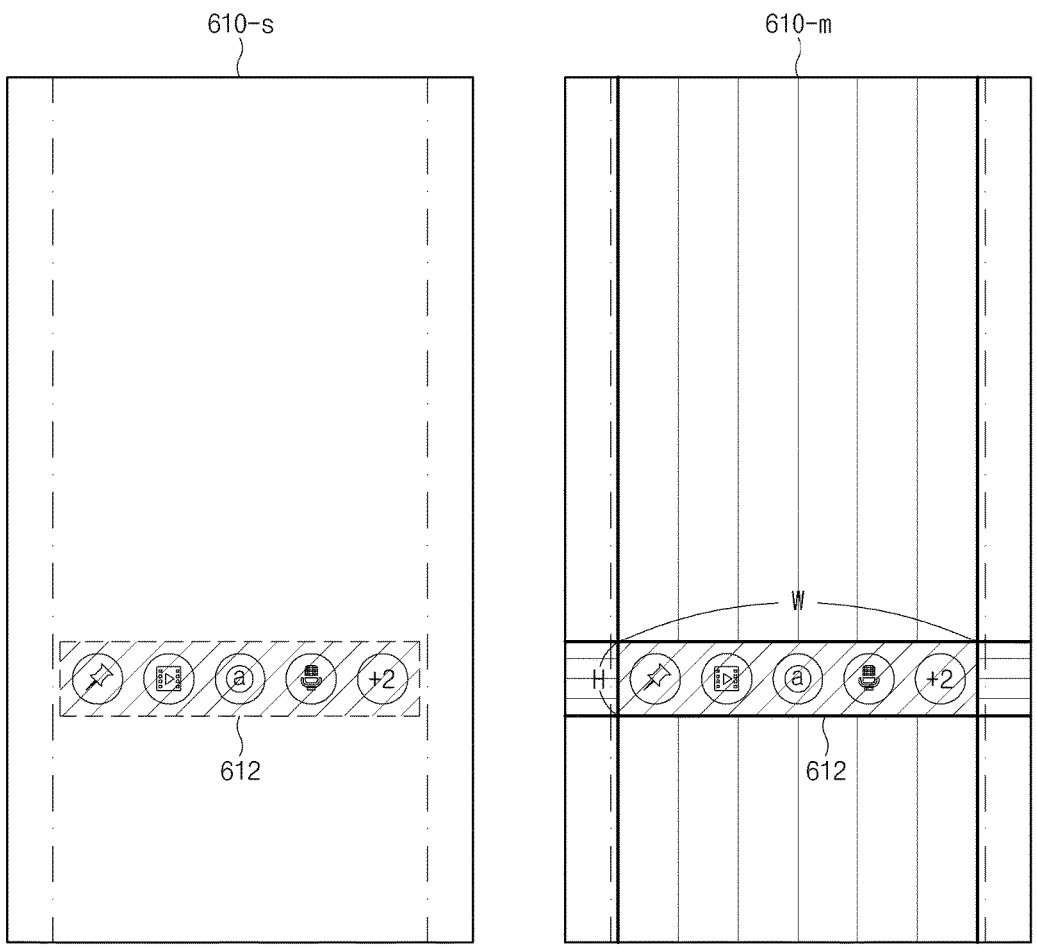
FIG. 6B illustrates touch recognition by a touch sensor according to one embodiment.

FIG. 6B illustrates touch recognition by a touch sensor according to one embodiment.

Referring to FIG. 6B, the touchscreen display 610-*s* may include a self-capacitive touch sensor, and the touchscreen display 610-*m* may include a mutual capacitive touch sensor (refer to FIG. 5B with regard to a detailed description of the self-capacitive touch sensor and the mutual capacitive touch sensor). Meanwhile, data associated with a specified area (i.e., the touch recognition area) 612 for sensing an effective touch in the touchscreen displays 610-*s* and 610-*m* may be in advance stored in the register included in a touch controller (refer to 741 of FIG. 7B).

According to an embodiment, in the touchscreen display 610-*s* including the self-capacitive touch sensor, the touch controller may activate only the touch recognition area 612 and may deactivate the remaining area. For example, the touch controller may scan only the capacitance value of electrode patches corresponding to the touch recognition area 612. The touch controller may not scan capacitance values of the electrode patches outside the touch recognition area 612.

According to an embodiment, in the touchscreen display 610-*m* including the mutual capacitive touch sensor, the touch controller may activate only the touch recognition area 612. To this end, the touch controller may scan capacitance values between longitudinal electrode strips corresponding to a width "W" of the touch recognition area 612 and transverse electrode strips corresponding to a height "H" of the touch recognition area 612. Since the touch controller scans only the capacitance value between the transverse electrode strip corresponding to the width "W" and the longitudinal electrode strip corresponding to the height "H", the touch controller may not scan capacitance values outside the touch recognition area 612.

According to touchscreen displays 610-s and 610-m illustrated in FIG. 6B, the touch controller may activate the hardware corresponding to the touch recognition area 612 and may deactivate the remaining area. Accordingly, it may be possible to reduce power consumption by the touch screen in the inactive state but at the same time allowing the touch screen to be capable of detecting effective touches. However, activation of the touch recognition area 612 illustrated in FIG. 6B is an example. The disclosed invention is not so limited. For example, the touch controller may activate the entire area of the touch sensor and may not report touches detected from the non-touch recognition area to the processor. Doing so would accomplish the same effect as the example illustrated in FIG. 6B.

Figure 6C:
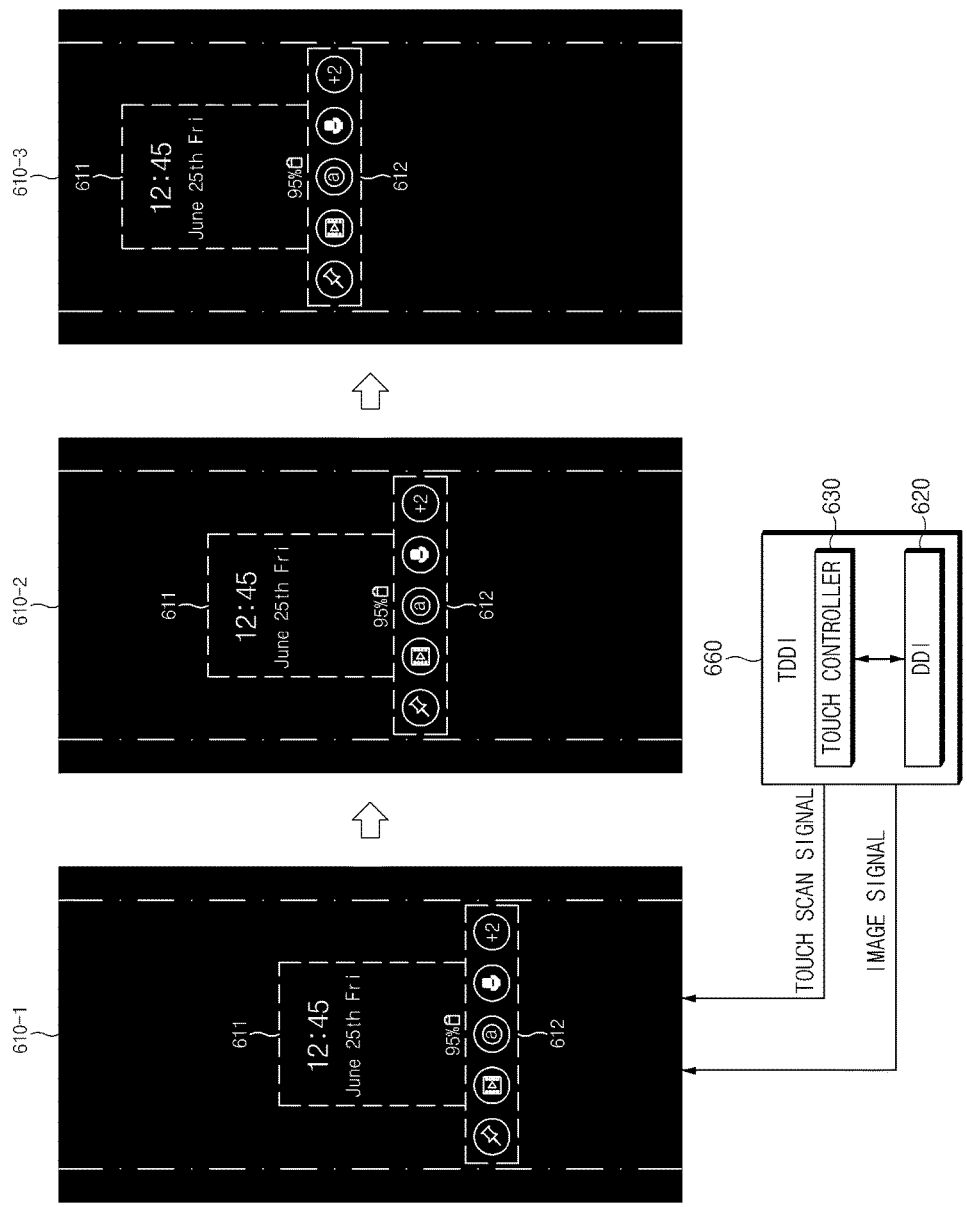
FIG. 6C illustrates movement of a touch recognition area according to one embodiment.

FIG. 6C illustrates movement of a touch recognition area according to one embodiment.

According to an embodiment, when the electronic device is in the inactive state, AOD content (e.g., a digital clock, a GUI object, or the like) displayed in the first area 611 and the second area 612 may move vertically or horizontally depending on operations of a touch-display driver integrated circuit (TDDI) 660. The TDDI 660 may comprise the corresponding component to the DDI 515 and the corresponding component to the touch controller 525. The AOD content may be moved to prevent burn-in of pixels in touchscreen displays 610-1, 610-2, and 610-3. The TDDI 660 illustrated in FIG. 6C may refer to a single chip in which the display driver integrated circuit 620 and the touch controller 630 are integrated.

For example, referring to the touchscreen display 610-1, the digital clock, the date, the battery state, and the like may be displayed in the first area 611 as the AOD content, and five GUI objects (e.g., icons) may be displayed in the second area 612. To this end, the display driver integrated circuit 620 included in the TDDI 660 may automatically output and/or update content displayed in the first area 611 and/or the second area 612 based on image data stored in a graphics RAM (GRAM).

According to an embodiment, the second area 612 may correspond to the touch recognition area. To recognize a touch in the second area 612, the touch controller 630 included in the TDDI 660 may obtain a display range of the second area 612 from the display driver integrated circuit 620 and may write the obtained result in a register as the touch recognition area. That is, the TDDI 660 may synchronize the AOD content output area in the second area 612 and the touch recognition area through its own processing.

According to an embodiment, the TDDI 660 may automatically move the AOD content displayed in the first area 611 and the second area 612 vertically or horizontally. For example, the TDDI 660 may horizontally move AOD content output in the first area 611 and/or the second area 612 at regular intervals in the daytime and may vertically move the AOD content at night, also at regular intervals. The reason is that the vision of a human is more sensitive to vertical movement than to horizontal movement. For another example, the distance that the first area 611 and/or the second area 612 moves is less in the daytime compared to at night. The reason is that the electronic device 601 is generally used more frequently in the daytime than in night.

For example, referring to the touchscreen display 610-2, the display driver integrated circuit 620 of the TDDI 660 may display AOD content above the previous position (as shown in 610-1). As the display location of the second area 612 including AOD content moves, the touch controller 630 may obtain the display range of the second area 612 from the display driver integrated circuit 620 and may update the touch recognition area stored in the register based on the obtained display range. As such, the AOD content output area in the second area 612 and the touch recognition area may be synchronized and may overlap. As in the above description, after a predetermined interval, as illustrated in the touchscreen display 610-3, the AOD content displayed in the first area 611 and the second area 612 may be moved again upward.

According to one embodiment, before switching into the inactive state, the processor may write data (hereinafter referred to as "time data") specifying the regular intervals for moving the AOD content into the register. The touch controller 630 may move the touch recognition area (e.g., the second area 612) at a time that the time data indicates.

Figure 7A:
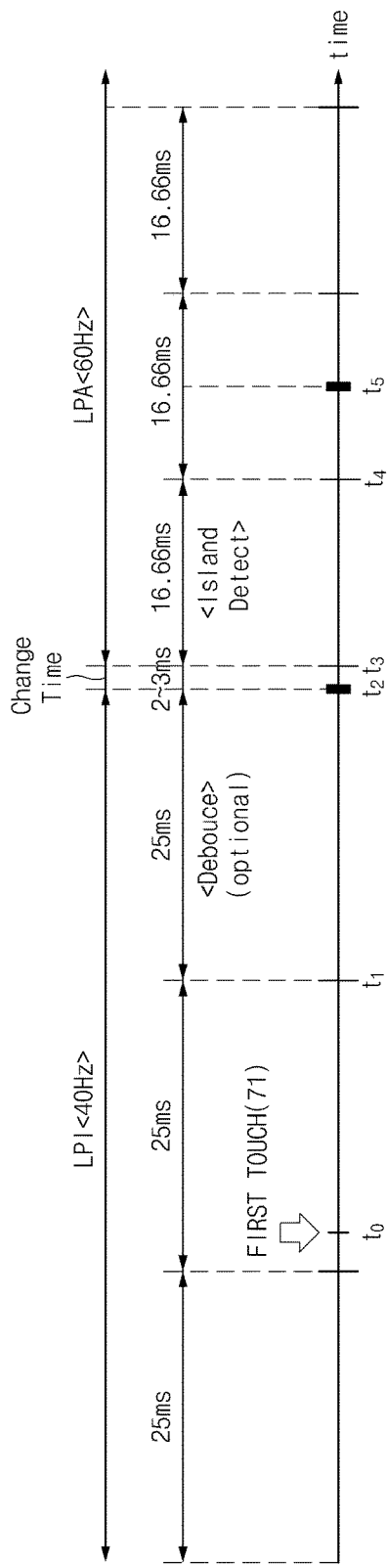
FIG. 7A illustrates an operation of a touch controller in an inactive state (or sleep state), according to one embodiment.

FIG. 7A illustrates an operation of a touch controller in an inactive state (e.g., sleep state), according to one embodiment.

How the touch controller 630 recognizes a touch while being in the inactive state (e.g., sleep state) is illustrated in FIG. 7A. According to an embodiment, in the inactive state (or sleep state), the touch controller 630 may operate in a low power mode (LPM). The low power mode LPM of the touch controller 630 may include a low power idle (LPI) mode (hereinafter referred to as an "LPI mode") and a low power active (LPA) mode (hereinafter referred to as an "LPA mode"). Below, reference numerals of FIG. 6A will be used to describe FIG. 7A.

According to an embodiment, before a first touch 71 is recognized (t<t0), the touch controller 630 may operate in the LPI mode. In the LPI mode, the touch controller 630 may drive the touch sensor of the touchscreen display 610 at a scan rate of a first frequency (e.g., 40 Hz). For example, in the LPI mode, the touch controller 630 may measure self-capacitance or mutual-capacitance of the touch sensor at the first frequency. In this case, to reduce current consumption, the touch controller 630 may deactivate various filters (e.g., noise prevention filters, etc.) for calculating a touch input.

If the first touch 71 is made at a time point t0, the touch controller 630 may additionally have an additional LPI frame t1 to t2 of 25 ms, as "debounce", after the LPI frame t0 to t1 of 25 ms. The debounce frame t1 to t2 may refer to a time interval that is set to determine whether the first touch 71 is made by the user or by noise. According to another embodiments, the debounce frame t1 to t2 may be omitted, meaning the debounce frame may be optional.

After the debounce frame t1 to t2, the touch controller 630 may have a change time t2 to t3 of about 2 to 3 ms to switch into the LPA mode.

The touch controller 630 may operate in the LPA mode from the time point t3. In the LPA mode, the touch controller 630 may drive the touch sensor at a scan rate of a second frequency higher than the first frequency. In this case, the touch controller 630 may activate various filters included in the touch controller 630 in order to more exactly calculate the touch location of a touch.

For example, the touch controller 630 operating in the LPA mode may determine whether the first touch 71 is a touch from the user, during the LPA frame t3 to t4 of 16.66 ms. The LPA frame t3 to t4 may be referred to as an "island detect frame." If it is determined at the LPA frame t3 to t4 that the first touch 71 is not made in the touch recognition area (e.g., the second area 612 of FIG. 6), the first touch 71 is not considered for determining an effective touch and touch controller 630 may enter the LPI mode again.

However, when it is determined that the first touch 71 is an effective touch by the user (i.e. when the first touch 71 is in the touch recognition area), the touch controller 630 operating in the LPA mode may calculate the location coordinate of the first touch 71 during a time period t4 to t5 by using the appropriate algorithm.

A single touch (e.g., the first touch 71) is used as an example in FIG. 7A. However, embodiments of the present disclosure may not be limited thereto. According to various embodiments, the effective touch may include a double touch or a long press. For example, when the effective touch is specified to have to be a double touch, only when a second touch is additionally sensed within a specified time (e.g., about 500 ms) from t5 of FIG. 7A, the touch controller 630 may determine that the effective touch is recognized. Also, for example, when the effective touch is specified to have to be a long press, only when the first touch 71 is consecutively sensed until a specified time elapses from t5 of FIG. 7A, the touch controller 630 may determine that the effective touch is recognized. Meanwhile, according to one embodiment, if it is determined that the effective touch is not recognized, the touch controller 630 may immediately enter the LPI mode or may enter the LPI mode after a predetermined time period (e.g. 3 seconds).

Figure 7B:
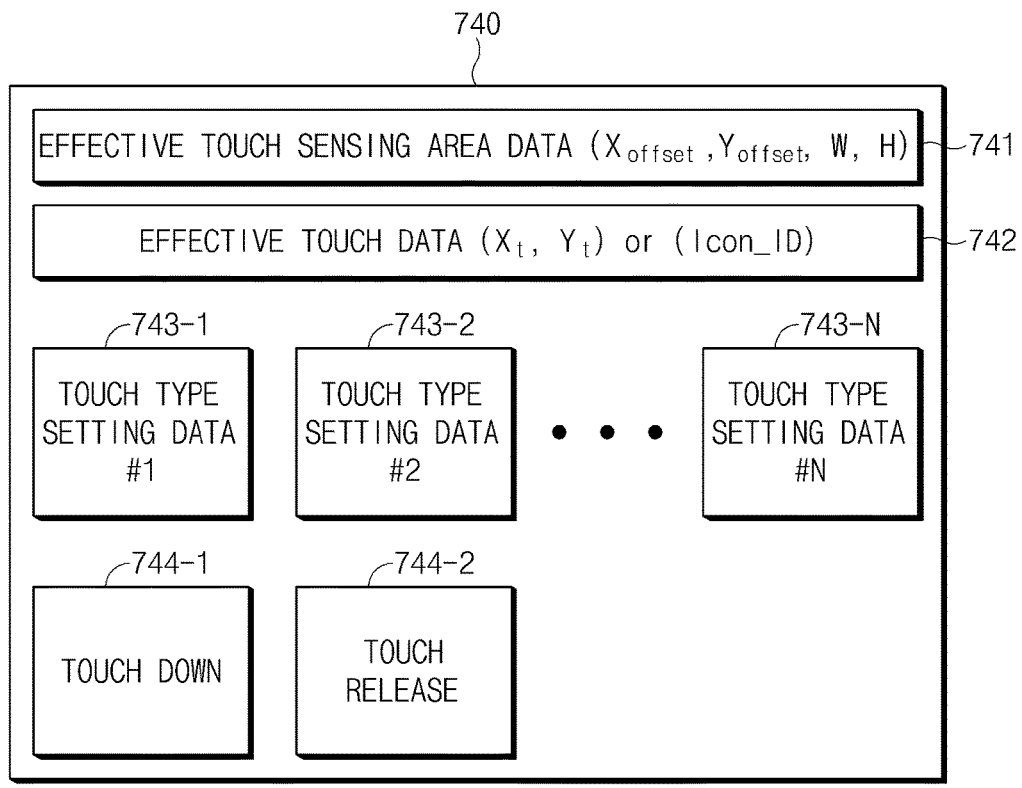
FIG. 7B illustrates a register of a touch controller according to one embodiment.

FIG. 7B illustrates a register of a touch controller according to one embodiment.

A register 740 according to an embodiment is illustrated in FIG. 7B. For example, the register 740 may correspond to the register 640 of FIG. 6A. For example, the register 740 may be implemented with a volatile memory, a nonvolatile memory, or a combination thereof. According to various embodiments, the register 740 may be simply referred to as a "memory."

The register 740 may provide storage space where data are written or read by a processor (650 of FIG. 6) or a touch controller (630 of FIG. 6). For convenience of description, reference numerals of FIG. 6 will be used to describe FIG. 7B. Also, various storage spaces are illustrated in FIG. 7B as examples.

According to an embodiment, data associated with the touch recognition area may be written in the storage space 741 by the processor 650. For example, the data may include width data "W" and height data "H" of the touch recognition area, or coordinate data ($X_{offset}$, $Y_{offset}$) associated with one point to define a circumference of the touch recognition area. The coordinate data ($X_{offset}$, $Y_{offset}$), the width data "W", and height data "H" may be expressed with several bytes and identify certain the pixels in the touchscreen display 610.

According to an embodiment, data associated with an effective touch may be written in the storage space 742 by the touch controller 630. The data about the effective touch written in the storage space 742 may be read by the processor 650. For example, the data associated with the effective touch may include coordinate data (Xt, Yt) of the location where the effective touch was made (in detail, refer to FIG. 8A). The coordinate data (Xt, Yt) may be expressed with several bytes and identify certain pixels included in the touchscreen display 610. As another example, the data associated with the effective touch may include identification information ICON_ID of a division area within the touch recognition area where the effective touch was made (in detail, refer to FIG. 8B).

According to an embodiment, data indicating types of the effective touch may be written in the storage spaces 743-1, 743-2, . . . , and 743-N by the processor 650. For example, the types of the effective touch may include a double touch including a first touch and a second touch, a touch down (i.e., a long press) made for at least a specified time duration, etc. The types of the effective touch may not be limited to the double touch and the long press. For example, the types of the effective touch may also include a touch (a so-called "force touch") of specified pressure or higher and a proximity touch (e.g., a hovering input or the like).

For example, the storage space 743-1 may be a storage space for enabling a double touch as an effective touch. In this case, the processor 650 may write specific data in the storage space 743-1 such that a double touch can be recognized as an effective touch. As such, if the double touch is recognized with reference to the storage space 743-1, the touch controller 630 may determine that an effective touch is sensed.

As in the above description, the storage space 743-2 may be a storage space for enabling a long press as an effective touch. In this case, the processor 650 may write specific data in the storage space 743-2 such that a long press can be recognized as an effective touch. As such, if the long press is recognized with reference to the storage space 743-2, the touch controller 630 may determine that an effective touch is sensed.

According to an embodiment, data indicating a touch down and data indicating a touch release may be respectively written in a storage space 744-1 and a storage space 744-2 by the touch controller 630. For example, the touch controller 630 may recognize at least one touch down and at least one touch release included in an effective touch (e.g., a double touch or a long press), may store the recognized results in the storage space 744-1 and the storage space 744-2, and may provide an interrupt to the processor 650. The processor 650 may read the storage space 744-1 and the storage space 744-2 in response to the interrupt. The processor 650 may determine a touch down and/or a touch release based on the read result and may apply a specified graphic effect (e.g., color inversion) to a GUI object corresponding to the effective touch.

Figure 8A:
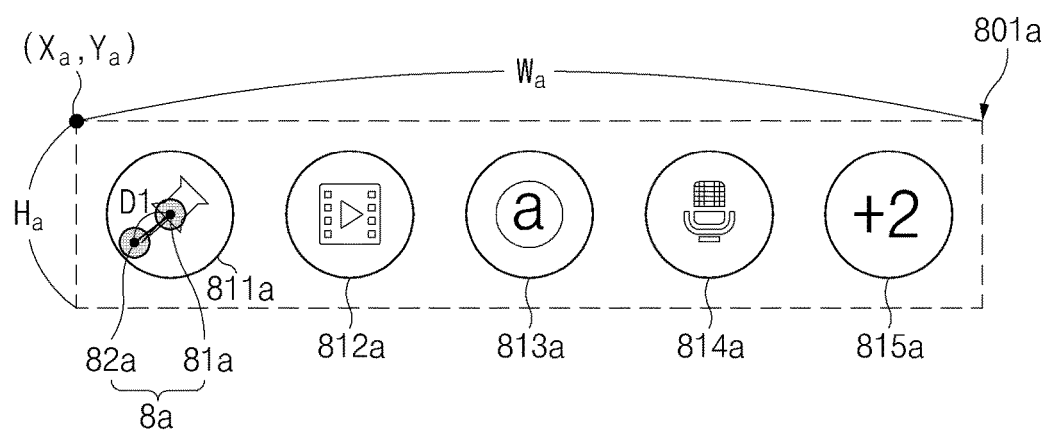
FIG. 8A illustrates recognition of an effective double touch according to one embodiment.

FIG. 8A illustrates recognition of an effective double touch according to an embodiment.

A specified area 801a for sensing an effective double touch while the electronic device is in the inactive state (e.g., sleep state) is illustrated in FIG. 8A. The specified area 801a may correspond to the second area 412 illustrated in FIG. 4 or the second area 612 illustrated in FIG. 6. To recognize a double touch as the effective touch, data for enabling the double touch may have been written in the storage space 743-1 illustrated in FIG. 7B.

According to an embodiment, a touch controller may determine the specified area 801a based on data stored in a specified storage space (e.g., the storage space 741 of FIG. 7B) of the register of the touch controller. For example, top-left coordinate data (Xa, Ya) of the specific area 801a, width Wa of the specified area 801a, and height Ha of the specified area 801a may be included in the specified storage space (e.g., the storage space 741 of FIG. 7B) of the register.

Also, according to an embodiment, GUI objects 811a, 812a, 813a, 814a, and 815a may be displayed in the specified area 801a. Each of the GUI objects 811a to 815a may be an application icon.

For example, the user may perform a double touch 8a on the GUI object 811a to execute the application corresponding to the GUI object 811a. The double touch 8a may have a first touch 81a and second touch 82a. If the distance D1 between the location of the first touch 81a and the location of the second touch 82a is not greater than a specified distance D0, the touch controller may determine that the double touch 8a is an effective touch.

If the touch controller determines the double touch 8a as an effective touch, the touch controller may write location coordinate data (Xt, Yt) corresponding to the first touch 81a in a specified storage space (e.g., the storage space 742 of FIG. 7B) as data associated with the effective touch. The touch controller may then transmit an interrupt to a processor.

In response to the interrupt, the processor may read the location coordinate data (Xt, Yt) corresponding to the first touch 81a from the specified storage space (e.g., the storage space 742 of FIG. 7B) of the register. Next, the processor may identify that the GUI object 811a corresponds to the coordinate data (Xt, Yt) and may execute an application corresponding to the GUI object 811a.

In contrast, if the distance D1 between the location of the first touch 81a and the location of the second touch 82a is greater than the specified distance D0, if the second touch 82a is not sensed within a preset time interval after the detection of the first touch 81a, or if the second touch 82a is not detected within the specified area 801a, the touch controller may determine that the double touch 8a is a non-effective touch.

Figure 8B:
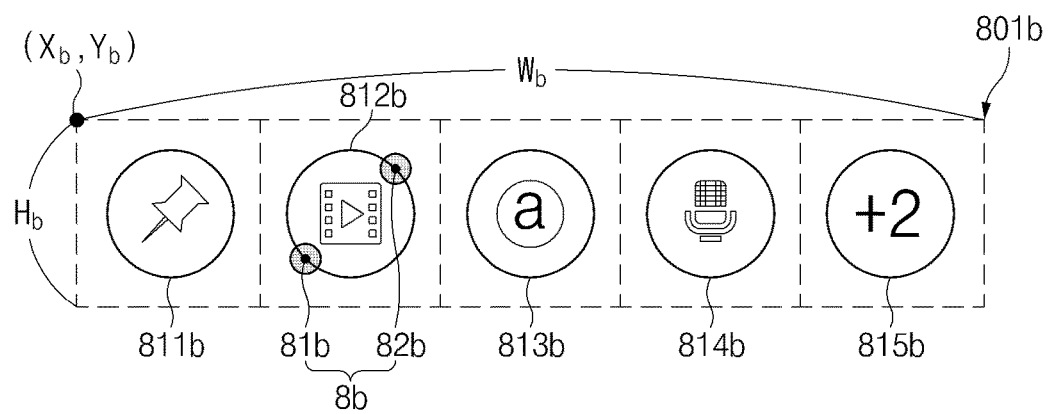
FIG. 8B illustrates recognition of the effective double touch according to another embodiment.

FIG. 8B illustrates recognition of an effective double touch according to another embodiment.

A specified area 801b for sensing an effective double touch while the electronic device is in the inactive state (e.g., sleep state) is illustrated in FIG. 8B. The specified area 801b may correspond to the second area 412 illustrated in FIG. 4 or the second area 612 illustrated in FIG. 6. To recognize a double touch as the effective touch, data for enabling the double touch may have been written in the storage space 743-1 illustrated in FIG. 7B.

According to an embodiment, a touch controller may determine the specified area 801b based on data stored in a specified storage space (e.g., the storage space 741 of FIG. 7B) of the register of the touch controller. For example, top-left coordinate data (Xb, Yb) of the specified area 801b, width Wb of the specified area 801b, and height Hb of the specified area 801b may be included in the specified storage space (e.g., the storage space 741 of FIG. 7B) of the register.

According to an embodiment, the specified area 801b may include a plurality of division areas. For example, the specified area 801b may be divided into a first division area including the GUI object 811b, a second division area including the GUI object 812b, a third division area including the GUI object 813b, a fourth division area including the GUI object 814b, and a fifth division area including the GUI object 815b.

According to an embodiment, the specified area 801b may be divided into the first division area to the fifth division area based on the number (e.g., 5) of GUI objects included in the specified area 801b. For example, a processor may specify the number (e.g., 5) of GUI objects in a register, and the touch controller may distinguish the first division area to the fifth division area by dividing the width Wb (or the height Hb) of the specified area 801b by the number (e.g., 5) of GUI objects.

For example, the user may perform a double touch (8b) on the GUI object 812b to execute an application corresponding to the GUI object 812b. If the location of the first touch 81b of the double touch 8b and the location of the second touch 82b are in the same division area, the touch controller may determine that the double touch 8b is an effective touch.

If the touch controller determines the double touch 8b as an effective touch, the touch controller may write location coordinate data corresponding to the first touch 81b in a specified storage space (e.g., the storage space 742 of FIG. 7B) as data associated with the effective touch. If the touch controller may then transmit an interrupt to a processor.

According to another embodiment, if the touch controller determines the double touch 8b as an effective touch, the touch controller may write identification information ICON_ID_2 of the second division area including the GUI object 812b in a specified storage space (e.g., the storage space 742 of FIG. 7B) of the register as data associated with an effective touch. Afterwards, the touch controller may transmit an interrupt to the processor.

In response to the interrupt, the processor may read the coordinate data of the location corresponding to the first touch 81b or the identification information ICON_ID_2 of the second division area from the specified storage space (e.g., the storage space 742 of FIG. 7B). Next, the processor may identify the GUI object 812b corresponds to the coordinate data of the first touch 81b or the identification information ICON_ID_2. Accordingly, the processor may execute an application corresponding to the GUI object 812b.

In contrast, if the location of the first touch 81b and the location of the second touch 82b is not within the same division area, if the second touch 82b is not sensed within a preset time interval after the detection of the first touch 81b, or if the second touch 82b is not detected within than the specified area 801b, the touch controller may determine that the double touch 8b is a non-effective touch.

Figure 8C:
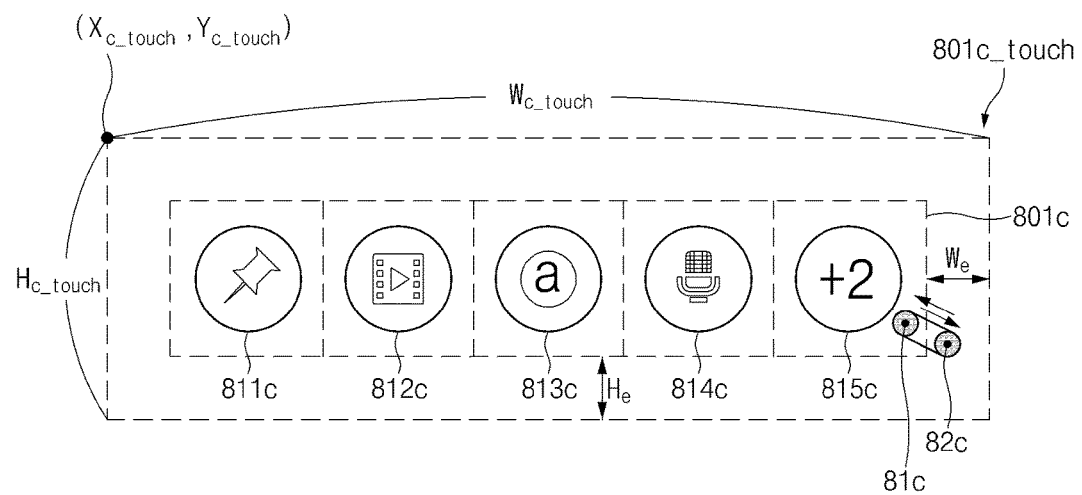
FIG. 8C illustrates recognition of the effective double touch according to yet another embodiment.

FIG. 8C illustrates recognition of an effective double touch according to yet another embodiment.

Referring to FIG. 8C, while the electronic device is in the inactive state (e.g., sleep state), GUI objects 811c, 812c, 813c, 814c, and 815c may be displayed in an area 801c. Also, to allow for the touch controller to recognize a double touch to the GUI objects 811c to 815c as an effective touch, for example, data for enabling the double touch may have been written in the storage space 743-1 illustrated in FIG. 7B.

According to an embodiment, a touch controller may determine a specified touch recognition area 801c_touch based on data stored in a specified storage space (e.g., the storage space 741 of FIG. 7B) of the register of the touch controller. For example, top-left coordinate data (Xc_touch, Yc_touch) of the specific touch recognition area 801c_touch, width Wc_touch of the specified touch recognition area 801c_touch, and height Hc_touch of the specified touch recognition area 801c_touch may be included in the specified storage space (e.g., the storage space 741 of FIG. 7B) of the register. The touch recognition area 801c_touch may be larger than the area 801c in which the GUI objects 811c to 815c are displayed by distance $W_e$ at the right and at the left and by distance $H_e$ at the top and at the bottom. According to an embodiment, the distances $W_e$ and $H_e$ may be determined, for example, depending on the geometries of the electrode strips or electrode patches included in a touch sensor. For example, $H_e$ may represent one to five rows of electrode strips or electrode patches.

As described with reference to FIG. 8A, when the area 801c including the GUI objects 811c to 815c coincides with the touch recognition area 801c_touch (i.e., 801c=801c_touch), touch detection errors may occur. For example, the user may perform a touch down at point 81c on the GUI object 815c. Within a specific time interval (e.g., 500 ms), the user may move his finger to point 82c while maintaining the touch. Thereafter, the user may move his finger back to point 81c. In this case, because the area 801c overlaps with area 801c_touch, and no touches are detected beyond the boundaries of 801c, the electronic device may perceive this gesture as two distinct touch down events, and thus recognize it as a double touch. That is, due to the restricted range of the touch recognition area 801*c*, the electronic device may erroneously detect an invalid touch gesture as a valid effective touch.

However, as illustrated in FIG. 8C, as the touch recognition area 801*c*_touch is expanded, the electronic device may recognize the entirety of the user's finger movements. That is, since the touch recognition area 801*c*_touch is expanded, erroneous touch detection may be avoided.

Figure 9A:
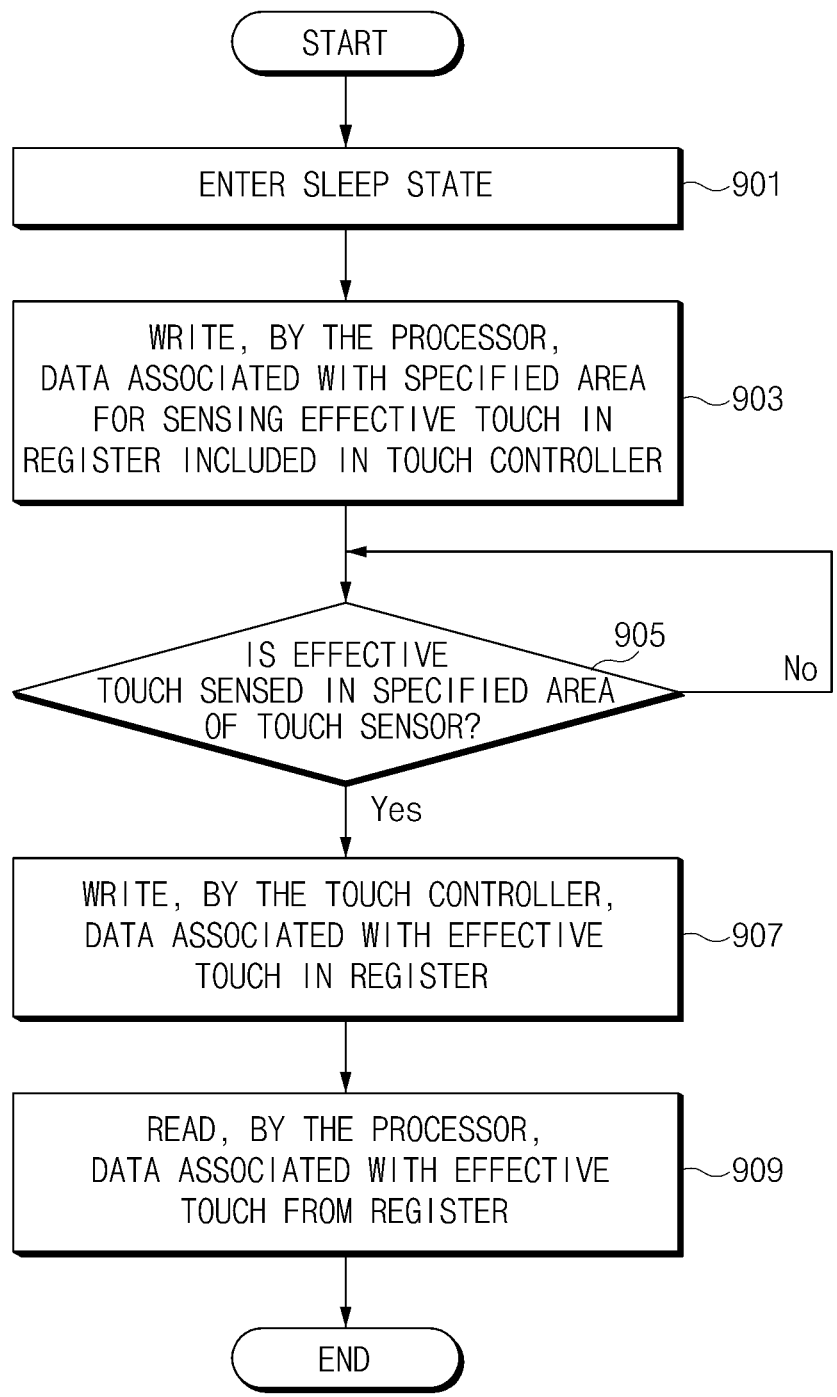
FIG. 9A is a flowchart illustrating a touch recognition method according to one embodiment.

FIG. 9A is a flowchart illustrating a touch recognition method according to one embodiment.

Referring to FIG. 9A, the touch recognition method according to an embodiment may include operation 901 to operation 909. Operation 901 to operation 909 may be performed by, for example, the electronic device illustrated in FIGS. 1 to 6A. For example, operation 901 to operation 909 may be implemented as instructions (commands) stored in a computer-readable recording medium or a memory. Hereinafter, the reference numerals of FIG. 6A will be used to describe operation 901 to operation 909, and a description that is the same or similar as described with reference to FIG. 6A may not be repeated here.

In operation 901, the electronic device 601 may enter the inactive state (e.g., sleep state). In the inactive state (or sleep state), various hardware and/or software modules included in the electronic device 601 may be deactivated or may perform only specified restricted functions. For example, the camera module in the electronic device 601 may be deactivated in the inactive state (e.g., sleep state), and the display driver integrated circuit 620, the touch controller 630, and the processor 650 may perform only specified restricted AOD functions in the inactive state (e.g., sleep state).

For example, in the inactive state (or sleep state), the display driver integrated circuit 620 may output a digital clock, a date, and a battery state in the first area 611 and may output a plurality of GUI objects in the second area 612 in the AOD mode. The display driver integrated circuit 620 that operates in the inactive state (or sleep state) may supply an image signal to the touchscreen display 610 at a driving frequency that is lower than that in the active state (or wake-up state).

For another example, in the inactive state (or sleep state), the touch controller 630 may sense a touch on the touchscreen display 610 at a touch scan rate of a frequency that is lower than in the active state (or wake-up state). In the inactive state (or sleep state), the touch controller 630 may provide data (e.g., coordinate data of a location at which a touch is made) associated with a sensed touch to the processor 650 at a frequency (report rate) that is lower than in the active state (or wake-up state).

In operation 903, the processor 650 of the electronic device 601 may temporarily operate in the active state (or wake-up state) and may write data associated with a specified area (e.g., the second area 612) for sensing an effective touch in the register 640. The data associated with the specified area (e.g., the second area 612) may include, for example, width data "W" and height data "H" of the specified area (e.g., the second area 612), or coordinate data ($X_{offset}$, $Y_{offset}$) associated with one point to define a circumference of the specified area (e.g., the second area 612). According to another embodiment, the specified area for sensing the effective touch may include a plurality of areas. The processor 650 may switch into the inactive state (or sleep state) after writing the data in the register 640.

In operation 905, while in the inactive state (e.g., sleep state), the touch controller 630 may determine whether an effective touch is sensed in the specified area (e.g., the second area 612) of the touchscreen display 610. If it is determined that the effective touch is sensed in the specified area (e.g., the second area 612), the touch controller 630 may perform operation 907; otherwise, the touch controller 630 may again perform operation 905.

According to an embodiment, in operation 905, the touch controller 630 may drive a touch sensor included in the touchscreen display 610 at a first frequency. If a touch is sensed in the touch sensor, the touch controller 630 may drive the touch sensor at a second frequency higher than the first frequency and may determine whether the effective touch is sensed.

According to an embodiment, in operation 905, the touch controller 630 may recognize various types of effective touches depending on data stored in the register 640 (e.g., 743-1, 743-2 as shown FIG. 7B). The touch controller 630 may determine whether a received touch is an effective touch based on data indicating types of effective touches written into the register. For example, the type of the effective touch may include a double touch, a long press, and the like.

Since it is determined that the effective touch is sensed in the specified area (e.g., the second area 612), in operation 907, the touch controller 630 may write data associated with the effective touch in the register 640. For example, the data associated with the effective touch may correspond to location coordinate data (refer to FIG. 8A) of the effective touch is made or identification information (refer to FIG. 8B) of a division area where the effective touch occurred.

In operation 909, the processor 650 may read data about the effective touch written in operation 907 from the register 640. Afterwards, the processor 650 may identify a GUI object in the specified area (e.g., the second area 612) based on the data associated with the effective touch. The processor 650 may apply a specified graphic effect to the identified GUI object and/or may execute an application program corresponding to the identified GUI object.

Figure 9B:
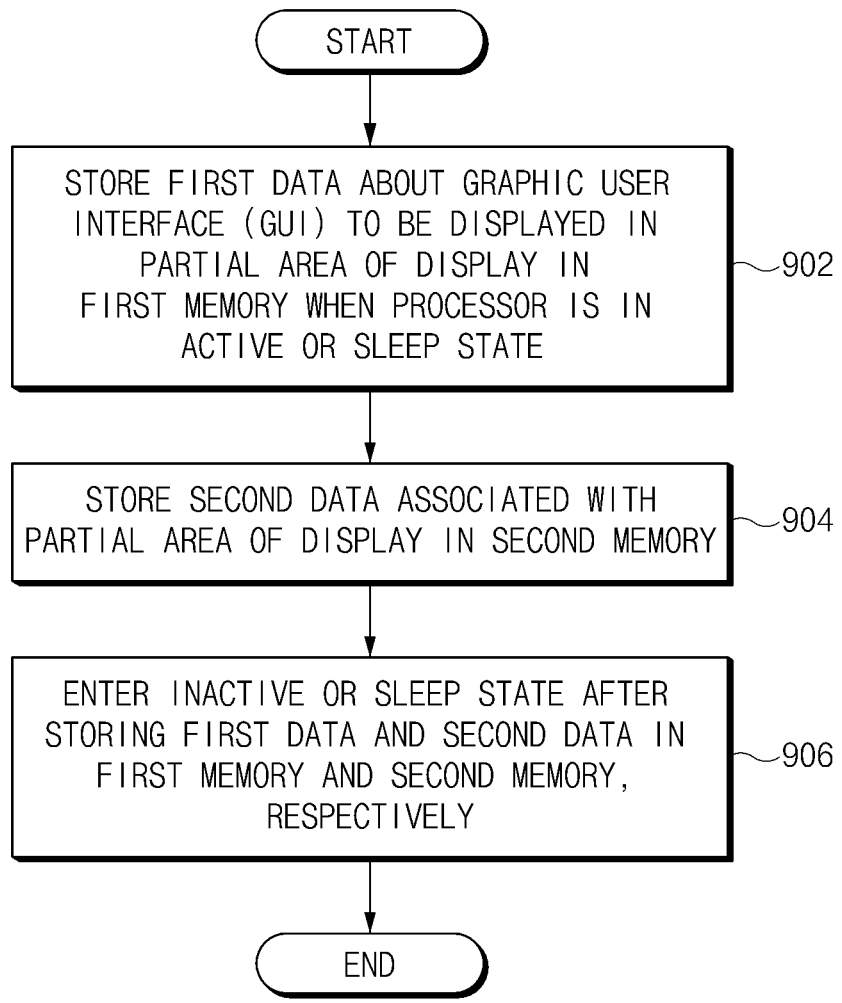
FIG. 9B is a flowchart illustrating the touch recognition method according to another embodiment.

FIG. 9B is a flowchart illustrating a touch recognition method according to another embodiment.

Referring to FIG. 9B, the touch recognition method according to an embodiment may include operation 902 to operation 906. Operation 902 to operation 906 may be executed by, for example, the electronic devices illustrated in FIGS. 1 to 6. For example, operation 902 to operation 906 may be implemented as instructions (commands) stored in a computer-readable recording medium or a memory. Hereinafter, the reference numerals of FIG. 6A will be used to describe operation 902 to operation 906, and a description that is the same or similar as described with reference to FIG. 6A may not be repeated here.

In operation 902, when the processor 650 of the electronic device 601 may store first data (e.g., image data) in a first memory (e.g., the graphics RAM 625) included in the display driver integrated circuit 620 for later use in the inactive state or sleep state. The first data may be associated with a graphic user interface (GUI) to be displayed in a partial area of the display 610. For example, the GUI may include GUI elements (e.g., icons or the like) of an application program. For another example, when the processor 650 is in the inactive state or sleep state, the remaining area of the display 610 other than the area in which the GUI is displayed may be turned off or be displayed as a black background.

In operation 904, the processor 650 may store second data (e.g., data associated with an area for recognizing an effective touch) in a second memory (e.g., the register 640) of the touch controller 630. The second data may be associated with the partial area of the display 610.

In operation 906, the processor 650 may store the first data (e.g., image data) and the second data (e.g., data associated with an area for recognizing an effective touch) in the first memory (e.g., the graphics RAM 625) and the second memory (e.g., the register 640), respectively. Afterwards, the processor 650 may switch into the inactive or sleep state.

According to an embodiment, when the processor 650 is in the inactive or sleep state, the touch controller 630 may detect a touch input and may compare the detection result of the touch input with the second data. In the case where the comparison result indicates that the location of the detected touch input coincides with the partial area, for example, the touch controller 630 may activate the processor 650 by providing an interrupt.

According to an embodiment, in the case where a touch input for selecting the GUI (e.g., an icon or the like) of the application program is received when the processor 650 is in the inactive or sleep state, the processor 650 may be activated. The activated processor 650 may drive (or execute) at least part of the application program.

Figure 10:
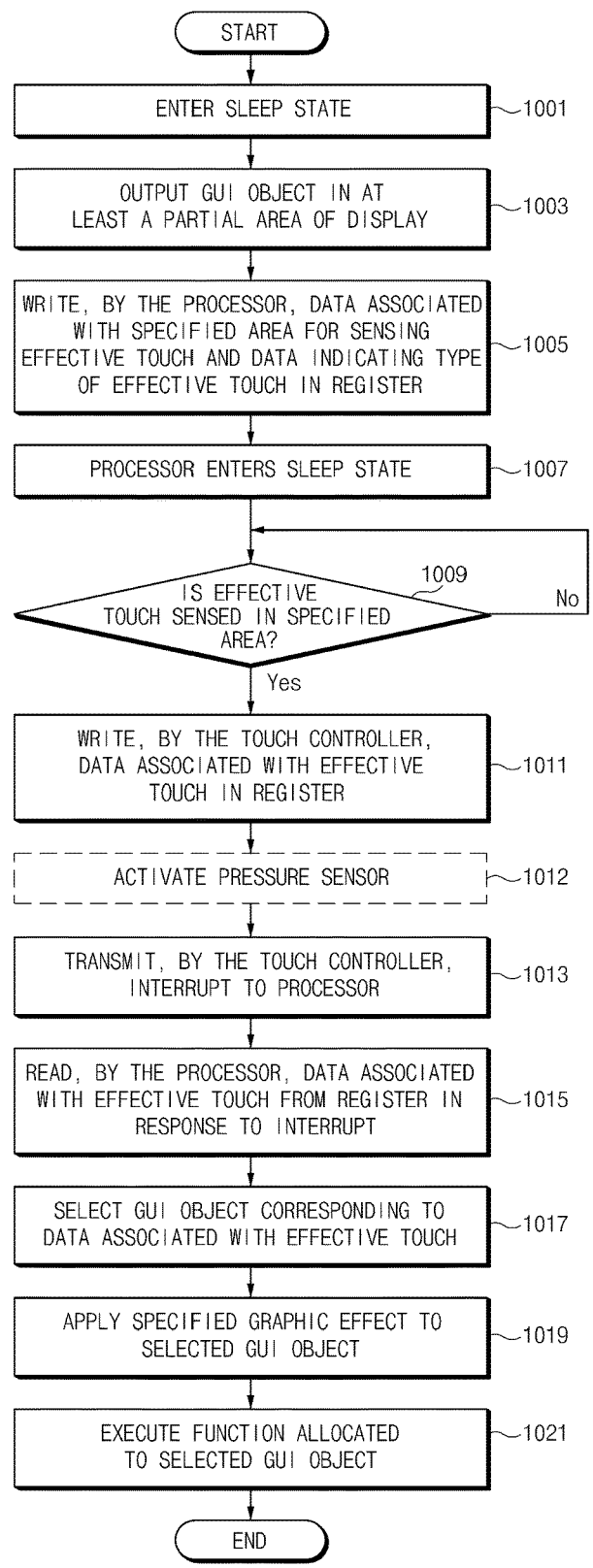
FIG. 10 is a flowchart illustrating the touch recognition method according to another embodiment.

FIG. 10 is a flowchart illustrating a touch recognition method according to another embodiment.

Referring to FIG. 10, the touch recognition method according to an embodiment may include operation 1001 to operation 1021. Operation 1001 to operation 1021 may be performed by, for example, the electronic device illustrated in FIGS. 1 to 6A. For example, operation 1001 to operation 1021 may be implemented as instructions (commands) stored in a computer-readable recording medium or a memory. Hereinafter, the reference numerals of FIG. 6A will be used to describe operation 1001 to operation 1021, and a description that is the same or similar as described with reference to FIG. 6A may not be repeated here.

In operation 1001, the electronic device 601 may enter the inactive state (e.g., sleep state). The display driver integrated circuit 620, the touch controller 630, and the processor 650 may enter the inactive state (or sleep state) and may perform only specified restricted functions. The inactive state (e.g., sleep state) may be referred to as a "low power mode" or "standby mode." For example, the user may push a specified button (e.g., a power button) of the electronic device 601 once so as to switch from the active state (or wake-up state) to the inactive state (or sleep state).

In operation 1003, the electronic device 601 may output one or more GUI objects (e.g., icons) in at least a partial area of the touchscreen display 610. For example, in the inactive state (or sleep state), the display driver integrated circuit 620 of the electronic device 601 may output a digital clock, a date, and a battery state in the first area 611 and may output one or more GUI objects in the second area 612. This is often called the AOD mode. After the processor 650 supplies image data indicating the digital clock, the date, and the battery state to the display driver integrated circuit 620, the display driver integrated circuit 620 may operate independent of the processor 650.

In operation 1005, the processor 650 may temporarily operate in the active state (or wake-up state) and may write data associated with a specified area (e.g., the second area 612) for sensing an effective touch and data indicating types of the effective touches in the register 640.

For example, the data associated with the specified area (e.g., the second area 612) may include width data "W" and height data "H" of the specified area (e.g., the second area 612), or coordinate data (Xoffset, Yoffset) associated with one point defining a circumference of the specified area (e.g., the second area 612)(refer to FIGS. 8A and 8B).

For example, the types of the effective touches may include a double touch or a long press. According to an embodiment, the processor 650 may write data for enabling double touch (or long press) in storage spaces (e.g., 743-1 or 743-2 of FIG. 7B) of the register 640.

After supplying image data indicating the digital clock, the date, and the battery state to the display driver integrated circuit 620 in operation 1003 and writing data associated with the specified area (e.g., the second area 612) for sensing an effective touch in the register 640 in operation 1005, in operation 1007, the processor 650 may again enter the inactive state (or sleep state).

In operation 1009, while in the inactive state, the touch controller 630 may determine whether an effective touch is sensed based on the data written in the register 640 in operation 1005. For example, the touch controller 630 may determine whether an effective touch is sensed in the specified area (e.g., the second area 612) based on the data associated with the specified area (e.g., the second area 612). Also, for example, the touch controller 630 may determine whether the type of the detected touch corresponds to one of the effective touch types, based on data indicating the types of effective touches (e.g., a double touch, a long press, or the like). If it is determined that the effective touch is detected or sensed in the specified area (e.g., the second area 612), the touch controller 630 may perform operation 1011; otherwise, the touch controller 630 may again perform operation 1009.

Since it is determined that the effective touch is sensed in the specified area (e.g., the second area 612), in operation 1011, the touch controller 630 may write the data associated with the effective touch in the register 640. For example, the data associated with the effective touch may correspond to location coordinate data of the effective touch or identification information of a division area corresponding to the effective touch.

In operation 1012, a pressure sensor IC may activate a pressure sensor in response to the touch controller 630 writing the data associated with the effective touch in the register 640. For example, the pressure sensor IC may receive a signal from the touch controller 630 and may be activated by using the received signal as a trigger.

According to one embodiment, operation 1012 may be omitted in an electronic device that is not equipped with the pressure sensor. Also, according to another embodiment, operation 1012 may be performed after operation 1015. For example, the processor 650 may provide the signal to the pressure sensor IC after obtaining data (e.g., coordinate data) associated with the effective touch in operation 1015. The pressure sensor IC may activate the pressure sensor in response to the signal from the processor 650.

In operation 1013, the touch controller 630 may provide an interrupt to the processor 650. The processor 650 may switch into the active or wake-up state by the interrupt.

In operation 1015, the processor 650 may read data about an effective touch written in operation 1011 from the register 640 in response to the interrupt from the touch controller 630.

In operation 1017, the processor 650 may select or determine the GUI object corresponding to data (e.g., location coordinate data of an effective touch or identification information of the division area corresponding to effective touch) associated with the effective touch (refer to FIGS. 8A and 8B).

In operation 1019, the processor 650 may apply a specified graphic effect (e.g., color inversion of the identified GUI object or temporary enlargement/reduction of the identified GUI object) to the GUI object selected in operation 1017. According to an embodiment, the graphic effect may be applied in response to a touch down/touch release of the effective touch.

In operation 1021, the processor 650 may execute a function that is allocated to the selected GUI object. For example, the allocated function may be to execute the application corresponding to the GUI object.

According to various embodiments of the present disclosure, even though an electronic device operates in an inactive state where power consumption is low, the electronic device may display various information and GUI objects in the display and may recognize a touch input to one of the GUI objects. Accordingly, both an always-on display (AOD) and an always-on touch function (AOT) may be implemented.

As described above, an electronic device according to an embodiment may include a processor, a touch sensor, and a touch controller including a register. The processor may write, into the register, data associated with a partial area of the touch sensor specified to sense an effective touch. When the effective touch is sensed in the partial area of the touch sensor, the touch controller may write data associated with the effective touch into the register, and the processor may then read the data associated with the effective touch from the register if the data associated with the effective touch is written in the register.

According to another embodiment, the touch controller may provide an interrupt to the processor, and the processor may read the data associated with the effective touch in response to the interrupt.

According to another embodiment, the data associated with the partial area of the touch sensor may include width data and height data of the partial area or coordinate data associated with one point defining a circumference of the partial area.

According to another embodiment, the processor may write the data associated with the partial area of the touch sensor into the register periodically or aperiodically.

According to another embodiment, the processor may be configured to enter an inactive state (e.g., sleep state) after writing the data associated with the partial area of the touch sensor into the register.

According to another embodiment, the data associated with the effective touch may include location coordinate data of the effective touch.

According to another embodiment, the touch controller may activate the partial area of the touch sensor and may deactivate the remaining area of the touch sensor other than the partial area.

According to another embodiment, the touch controller may drive the touch sensor at a first frequency, and if a touch is sensed in the touch sensor, the touch controller may drive the touch sensor at a second frequency higher than the first frequency and may determine whether the effective touch is sensed.

According to another embodiment, the processor may further write data indicating one or more types of the effective touch into the register, and the touch controller may determine whether the effective touch is sensed, based on the data indicating the one or more types.

According to another embodiment, the one or more types of the effective touch may include a double touch including a first touch and a second touch or a long press.

According to another embodiment, the touch controller may drive the touch sensor at a first frequency, and the touch controller may drive the touch sensor at a second frequency higher than the first frequency if a first touch is sensed in the partial area of the touch sensor, and may determine the effective touch to be a double touch if a second touch is sensed during a specified time interval after the first touch is sensed.

According to another embodiment, the touch controller may determine the double touch as the effective touch if a distance between a location of the first touch and a location of the second touch is not greater than a specified distance.

According to another embodiment, the partial area of the touch sensor may include a plurality of division areas, and the touch controller may determine the double touch as the effective touch if a location of the first touch and a location of the second touch are within the same division area.

According to another embodiment, if the touch controller determines the double touch as the effective touch, the touch controller may write coordinate data of a location of the first touch as the data associated with the effective touch.

According to another embodiment, if the touch controller determines the double touch as the effective touch, the touch controller may write identification information of the same division area where the first and second touches are located as the data associated with the effective touch.

According to another embodiment, the touch controller may drive the touch sensor at a first frequency, and the touch controller may drive the touch sensor at a second frequency higher than the first frequency if the first touch is sensed in the touch sensor, and may determine the touch as a non-effective touch if the second touch is not sensed in the specified area during a specified time or if the second touch is not sensed in the remaining area of the touch sensor other than the specified area.

According to another embodiment, the electronic device may further include a display coupled to the processor. The display may be overlaid with the touch sensor or including the touch sensor. The processor may output at least one graphic user interface (GUI) object in a partial area of the display corresponding to the partial area of the touch sensor, may identify a GUI object at a location corresponding to the read data associated with the effective touch, and may execute a function allocated to the identified GUI object.

According to another embodiment, the partial area of the display may at least partially overlap with the partial area of the touch sensor.

According to another embodiment, the processor may apply a specified graphic effect to the identified GUI object before execution of the function allocated to the identified GUI object.

According to another embodiment, the effective touch may include at least one touch down and at least one touch release. The touch controller may provide an interrupt to the processor after writing data indicating the at least one touch down and the at least one touch release in the register. The processor may apply a specified graphic effect to the identified GUI object in response to the interrupt.

A touch recognition method according to an embodiment may include writing, into a register included in a touch controller, data associated with a partial area of a touch sensor, when the effective touch is sensed in the partial area of the touch sensor, writing, into the register by the touch controller, data associated with the effective touch, and when the data associated with the effective touch is written into the register, reading the data associated with the effective touch from the register.

According to another embodiment, the touch recognition method may further include outputting at least one graphic user interface (GUI) object in a partial area of a display, wherein the partial area of the display at least partially overlaps with the partial area of the touch sensor, determining a GUI object at a location corresponding to the read data associated with the effective touch, and executing a function allocated to the determined GUI object.

An electronic device according to an embodiment may include a housing that includes a first surface and a second surface opposite the first surface, a display that is exposed through the first surface and is interposed between the first surface and the second surface, a touch panel that is interposed between the display and the first surface or is coupled to the display, a display driver integrated circuit (DDI) that is electrically connected to the display and including a first memory, a touch controller integrated circuit (IC) that is electrically connected to the touch panel and includes a second memory, a processor that is electrically connected to the DDI and the touch controller IC, and a nonvolatile memory that is electrically connected to the processor. The nonvolatile memory stores instructions that, when executed, cause the processor to store, in the first memory, first data related to a graphic user interface (GUI) to be displayed in a portion of the display while the processor is deactivated or in a sleep state, to store second data associated with the partial area of the display in the second memory, and to enter the sleep state after storing the first data and the second data in the first memory and the second memory, respectively.

According to another embodiment, when the processor is in the sleep state, the touch controller IC may compare a location of a detected touch input with the second data.

According to another embodiment, the touch controller IC may be configured to activate the processor if the comparison result indicates the location of the detected touch input coincides with at least part of the portion of the display.

According to another embodiment, the GUI may include a GUI of an application program. The instructions may cause the processor to be activated and to drive at least part of the application program if the detected touch input selects the GUI of the application program.

According to another embodiment, the DDI may display the remaining area of the display other than the portion of the display displaying the GUI as a black background when the processor is in the sleep state.

The term "module" used in this disclosure may represent, for example, a unit including one or more combinations of hardware, software and firmware. The term "module" may be interchangeably used with the terms "unit," "logic," "logical block," "component" and "circuit". The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in computer-readable storage media in the form of a program module. The instruction, when executed by a processor (e.g., the processor 120), may cause the one or more processors to perform a function corresponding to the instruction. The computer-readable storage media, for example, may be the memory 130.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, a program instruction may include not only a mechanical code such as things generated by a compiler but also a high-level language code executable on a computer using an interpreter. The above hardware unit may be configured to operate via one or more software modules for performing an operation according to various embodiments, and vice versa.

A module or a program module according to various embodiments may include at least one of the above elements, or a part of the above elements may be omitted, or additional other elements may be further included. Operations performed by a module, a program module, or other elements according to various embodiments may be executed sequentially, in parallel, repeatedly, or in a heuristic method. In addition, some operations may be executed in different sequences or may be omitted. Alternatively, other operations may be added.

According to various embodiments of the present disclosure, in an inactive state where power consumption is low, an electronic device may display various information and GUI objects in a display and may recognize a touch input to one of the GUI object. Accordingly, both an always-on display (AOD) and an always-on touch functions (AOT) may be implemented. Additionally, a variety of features directly or indirectly understood through this disclosure may be provided.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a processor;
   a touch sensor;
   a display overlaid with the touch sensor or including the touch sensor;
   a display driver integrated circuit (DDI) including a graphics memory; and
   a touch controller including a register,
   wherein the processor is configured to:

write, into the graphics memory, image data to be displayed in a first partial area of the display when the processor is in a sleep state, write, into the register, data associated with a second partial area of the touch sensor specified to sense an effective touch, wherein the second partial area at least partially overlaps the first partial area, and wherein the second partial area of the touch sensor is activated while a remaining area of the touch sensor outside the second partial area is deactivated, wherein, when the effective touch is sensed in the second partial area of the touch sensor, the touch controller is configured to write, into the register, data associated with the effective touch, and wherein, when the data associated with the effective touch is written into the register, the processor is configured to read the data associated with the effective touch from the register.

2. The electronic device of claim 1, wherein the touch controller is configured to provide an interrupt to the processor, and wherein the processor is configured to read the data associated with the effective touch in response to the interrupt.

3. The electronic device of claim 1, wherein the data associated with the second partial area of the touch sensor includes width data and height data of the second partial area or coordinate data associated with one point defining a circumference of the second partial area.

4. The electronic device of claim 1, wherein the processor is configured to write the data associated with the second partial area of the touch sensor into the register periodically or aperiodically.

5. The electronic device of claim 1, wherein the processor is configured to enter the sleep state after writing the data associated with the second partial area of the touch sensor into the register.

6. The electronic device of claim 1, wherein the data associated with the effective touch includes location coordinate data of the effective touch.

7. The electronic device of claim 1, wherein the touch controller is configured to drive the touch sensor at a first frequency, and wherein when a touch is sensed in the touch sensor, the touch controller is configured to drive the touch sensor at a second frequency higher than the first frequency and determine whether the effective touch is sensed.

8. The electronic device of claim 1, wherein the processor is further configured to write data indicating one or more types of the effective touch into the register, and wherein the touch controller is configured to determine whether the effective touch is sensed based on the data indicating the one or more types.

9. The electronic device of claim 8, wherein the one or more types of the effective touch includes a double touch including a first touch and a second touch and a long press.

10. The electronic device of claim 1, wherein the touch controller is configured to drive the touch sensor at a first frequency, and wherein the touch controller is configured to drive the touch sensor at a second frequency higher than the first frequency if a first touch is sensed in the second partial area of the touch sensor, and determine the effective touch to be a double touch if a second touch is sensed during a specified time interval after the first touch is sensed.

11. The electronic device of claim 10, wherein the touch controller is configured to determine the double touch as the effective touch when a distance between a location of the first touch and a location of the second touch is not greater than a specified distance.

12. The electronic device of claim 10, wherein the second partial area of the touch sensor includes a plurality of division areas, and wherein the touch controller is configured to determine the double touch as the effective touch when a location of the first touch and a location of the second touch are within one division area among the plurality of division areas.

13. The electronic device of claim 10, wherein when the touch controller determines the double touch as the effective touch, the touch controller is configured to write coordinate data of a location of the first touch as the data associated with the effective touch.

14. The electronic device of claim 12, wherein when the touch controller determines the double touch as the effective touch, the touch controller writes identification information of the one division area as the data associated with the effective touch.

15. The electronic device of claim 1,
wherein the processor is configured to:
output at least one graphic user interface (GUI) object in the first partial area of the display,
identify a GUI object at a location corresponding to the data associated with the effective touch, and
execute a function allocated to the identified GUI object.

16. The electronic device of claim 15, wherein the processor is configured to apply a specified graphic effect to the identified GUI object before execution of the function allocated to the identified GUI object.

17. The electronic device of claim 15, wherein the effective touch includes at least one touch down and at least one touch release, wherein the touch controller is configured to provide an interrupt to the processor after writing data indicating the at least one touch down and the at least one touch release into the register, and wherein the processor is configured to apply a specified graphic effect to the identified GUI object in response to the interrupt.

18. An electronic device comprising:
a housing including a first surface and a second surface opposite the first surface;
a display exposed through the first surface and interposed between the first surface and the second surface;
a touch panel interposed between the display and the first surface or coupled to the display;
a display driver integrated circuit (DDI) electrically connected to the display and including a first memory;
a touch controller integrated circuit (IC) electrically connected to the touch panel and including a second memory;
a processor electrically connected to the DDI and the touch controller IC; and
a nonvolatile memory electrically connected to the processor,
wherein the nonvolatile memory stores instructions that, when executed, cause the processor to:
store, in the first memory, first data related to a graphic user interface (GUI) to be displayed in a first portion of the display while the processor is deactivated or in a sleep state, store second data associated with a second portion of the touch panel in the second memory, wherein the second portion of the touch panel at least partially overlaps the first portion of the display, and wherein the second portion of the touch panel is activated while a remaining area of the touch panel outside the second portion is deactivated, and enter the sleep state after storing the first data in the first memory and the second data in the second memory.

\* \* \* \* \*